United States Patent
Muto

(10) Patent No.: US 10,804,800 B2
(45) Date of Patent: Oct. 13, 2020

(54) POWER SUPPLYING APPARATUS, POWER SUPPLYING CONTROL APPARATUS, AND POWER SUPPLYING CONTROL METHOD

(71) Applicant: Renesas Electronics Corporation, Tokyo (JP)

(72) Inventor: Kiichi Muto, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 346 days.

(21) Appl. No.: 15/879,925

(22) Filed: Jan. 25, 2018

(65) Prior Publication Data

US 2018/0287491 A1    Oct. 4, 2018

(30) Foreign Application Priority Data

Mar. 28, 2017    (JP) ................................. 2017-063033

(51) Int. Cl.
*H02J 7/00* (2006.01)
*H02M 3/156* (2006.01)
(Continued)

(52) U.S. Cl.
CPC ............ *H02M 3/156* (2013.01); *G06F 1/266* (2013.01); *G06F 1/3206* (2013.01);
(Continued)

(58) Field of Classification Search
CPC ..... H02J 7/00041; H02J 7/0027; G06F 1/266; G06F 1/3206; H02M 2001/009
See application file for complete search history.

(56) References Cited

U.S. PATENT DOCUMENTS

2009/0019300 A1*  1/2009  Matton .................. G06F 1/266
                                                                713/324
2010/0077337 A1*  3/2010  Yang ..................... G06F 1/266
                                                                715/771
(Continued)

FOREIGN PATENT DOCUMENTS

JP    2010-244457 A    10/2010

OTHER PUBLICATIONS

European Search Report, dated Jul. 24, 2018, for European Patent Application No. 18156849.4-1216.
(Continued)

*Primary Examiner* — Arun C Williams
(74) *Attorney, Agent, or Firm* — McDermott Will & Emery LLP

(57) ABSTRACT

To provide a power supplying control apparatus, a power supplying apparatus, and a power supplying control method which control power supply appropriately. A power supplying apparatus according to the present embodiment is equipped with a plurality of ports corresponding to a USB (Universal Serial Bus) PD (Power Delivery) standard, a plurality of electric power supplying circuits which are provided corresponding to the ports and supply power to power receiving devices coupled to the ports, and a controller which holds a table of power profiles to which power receiving capabilities for each power receiving device are set, and controls the electric power supplying circuits, based on the table in such a manner that total supply power supplied from the electric power supplying circuits does not exceed a prescribed value.

19 Claims, 20 Drawing Sheets

(51) Int. Cl.
*G06F 1/26* (2006.01)
*G06F 1/3206* (2019.01)
*H02M 1/00* (2006.01)

(52) U.S. Cl.
CPC ........ *H02J 7/0027* (2013.01); *H02J 7/00041* (2020.01); *H02M 2001/009* (2013.01)

(56) References Cited

U.S. PATENT DOCUMENTS

| | | | |
|---|---|---|---|
| 2011/0150431 A1* | 6/2011 | Klappert | H04N 7/163 386/296 |
| 2013/0290765 A1* | 10/2013 | Waters | G06F 1/266 713/340 |
| 2015/0121095 A1* | 4/2015 | Tsai | G06F 1/266 713/310 |
| 2015/0264208 A1* | 9/2015 | Achiwa | H04N 1/00885 1/885 |
| 2016/0117274 A1 | 4/2016 | Waters | |

OTHER PUBLICATIONS

European Office Action, dated Jun. 25, 2019, in European Patent Application No. 18 156 849.4-1216.

\* cited by examiner

POWER SUPPLYING APPARATUS, POWER SUPPLYING CONTROL APPARATUS, AND POWER SUPPLYING CONTROL METHOD

CROSS-REFERENCE TO RELATED APPLICATIONS

The disclosure of Japanese Patent Application No. 2017-063033 filed on Mar. 28, 2017 including the specification, drawings and abstract is incorporated herein by reference in its entirety.

BACKGROUND

The present invention relates to a power supplying apparatus, a power supplying control apparatus, and a power supplying control method.

A USB communication control system compliant with a USB (Universal Serial Bus) standard has been disclosed in Patent Document 1. The USB communication control system is equipped with a host apparatus, a hub apparatus, and a device apparatus. A device apparatus taking up to 500 mA is defined as a high power device, and a USB apparatus taking up to 100 mA is defined as a low power device.

A hub controller for the hub apparatus has a function of performing monitoring and adjustments of power. The hub apparatus supplies 500 mA acquired from the host apparatus to a device apparatus group coupled to a downstream port. For example, when a device apparatus is newly coupled in a state in which the low power device is being coupled, it is determined whether 100 mA necessary for enumeration can be supplied to the new device apparatus.

When 100 mA can be ensured, the hub controller performs enumeration and determines whether required power corresponding to consumption power of the new device apparatus can be supplied. When it is not possible to supply the same, the coupling to the new device apparatus is disabled.

RELATED ART DOCUMENTS

[Patent Document]
 [Patent Document 1] Japanese Unexamined Patent Publication Laid-Open No. 2010-244457

SUMMARY

Incidentally, it is possible to supply a power of 100 W (20V, 5 A) from one port under a USB PD (Power Delivery) standard. There is, however, no disclosure in Patent Document 1 as to the supply of power compliant with the USB PD standard.

Other objects and novel features of the present invention will become apparent from the description of the present specification and the accompanying drawings.

According to one aspect of the present invention, it is possible to suitably control power supply compliant with the USB PD (Power Delivery) standard.

According to the one aspect, the power supply compliant with the USB PD (Power Delivery) standard can suitably be controlled.

DETAILED DESCRIPTION

Figure 1:
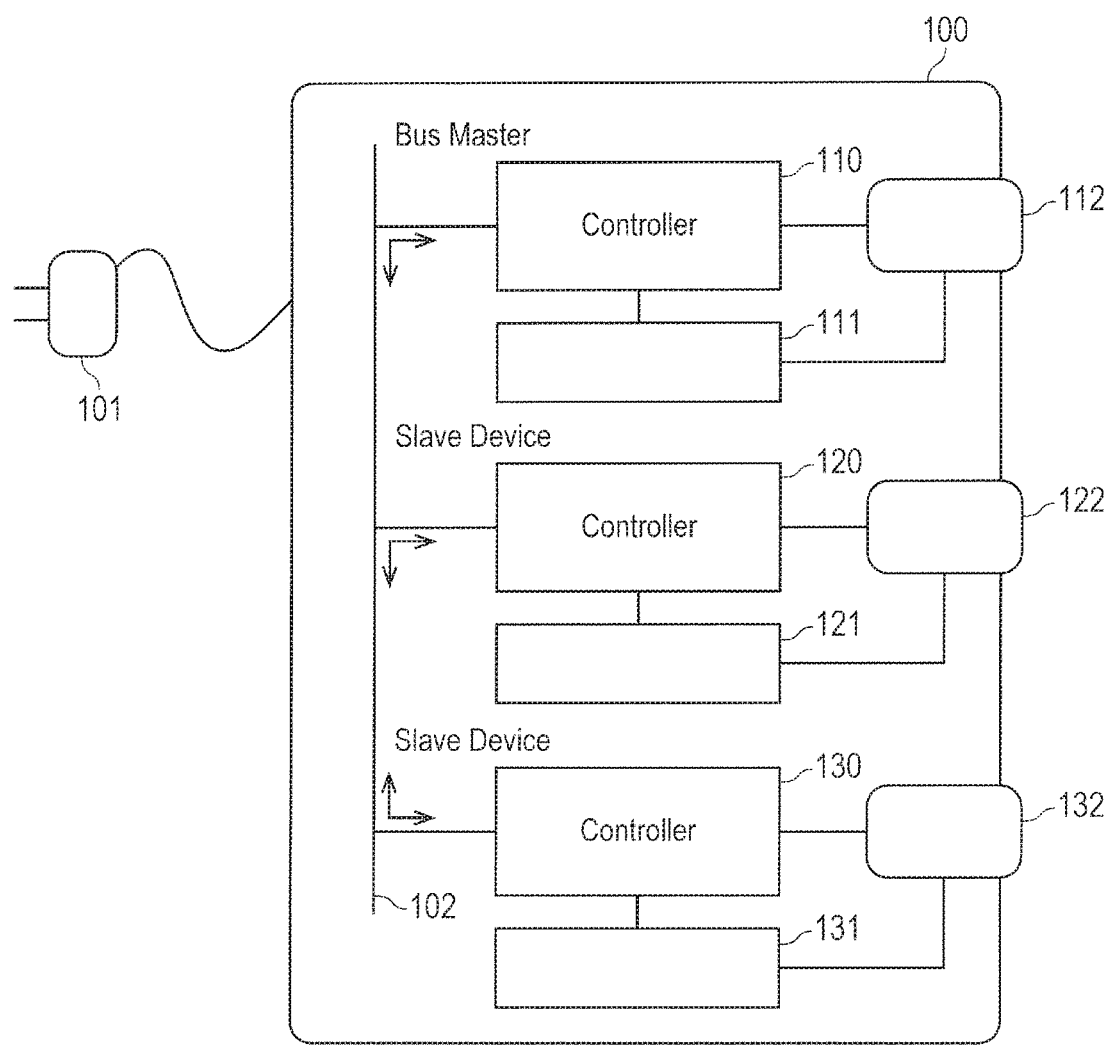
FIG. 1 is a typical diagram showing the configuration of a power supplying apparatus according to an embodiment 1.

For clarification of description, the following description and drawings have been appropriately omitted and simplified. Further, respective elements described in the drawings as functional blocks of performing various processing can be configured by a CPU, a memory, and other circuits in terms of hardware and are realized by programs loaded in a memory, etc. in terms of software. It will thus be understood by those skilled in the art that these functional blocks can be realized in various forms by only hardware, only software, or their combination. They are not limited to or by any thereof. Incidentally, in the respective drawings, the same reference numerals are respectively attached to the same elements, and their dual description will be omitted as needed.

Further, the above-described programs can be stored using various types of non-transitory computer readable mediums and supplied to a computer. The non-transitory computer readable mediums include various types of tangible storage mediums. Examples thereof include a magnetic recording medium (e.g., flexible disk, magnetic tape, hard disk drive), an optical magnetic recording medium (e.g., optical magnetic disk), a CD-ROM (Read Only Memory) CD-R, a CD-R/W, a semiconductor memory (e.g., mask ROM, PROM (Programmable ROM), an EPROM (Erasable PROM), a flash ROM, and a RAM (Random Access Memory). Further, the programs may be supplied to the computer by the various types of transitory computer readable mediums. Examples of the transitory computer readable mediums include an electrical signal, an optical signal, and electromagnetic waves. The transitory computer readable medium is capable of supplying a program to the computer through a wired communication path such as an electric wire, an optical fiber, or the like, or a wireless communication path.

The configuration of a power supplying apparatus 100 according to an embodiment 1 will be described using FIG. 1. FIG. 1 is a typical diagram showing the configuration of the power supplying apparatus 100. The power supplying apparatus 100 is equipped with a power supply plug 101, first to third controllers 110, 120, and 130, first to third electric power supplying circuits 111, 121, and 131, and first to third ports 112, 122, and 132.

Incidentally, in the following description, the first port 112, the second port 122, and the third port 132 may also respectively be described as the port 112, the port 122, and the port 132. Likewise, the first to third electric power supplying circuits 111, 121, and 131 may respectively be referred to as the electric power supplying circuits 111, 121, and 131, and the first to third controllers 110, 120, and 130 may respectively be referred to as the controllers 110, 120, and 130.

The power supply plug 101 is inserted into, for example, a socket for a commercial power supply of 50 Hz, 100V. Of course, the voltage and frequency of the commercial power supply are not limited to 50 Hz, 100V, but may be made to correspond to the standards of a country or a district. For example, the voltage is not limited to 100V, but may be 120V, 200V, 240V and so on. The frequency may be 60 Hz.

The power supplying apparatus 100 is a USB hub apparatus equipped with the first port 112, the second port 122, and the third port 132. Also, in FIG. 1, the power supplying apparatus 100 is provided with the three ports, but the number of ports may be two or more. The ports 112, 122, and 132 are power feeding ports compliant with the USB Power Delivery (hereinafter called USB PD) standard. Specifically, the ports 112, 122, and 132 are respectively USB ports compliant with a USB Type-C standard.

Accordingly, power receiving devices are respectively coupled to the ports 112, 122, and 132 directly or through USB cables. When the power receiving devices are coupled thereto, the power receiving devices are supplied with power in accordance with the USB PD standard. Under the USB PD standard, a power of 100 W (20V, 5 A) at maximum can be supplied per port.

The electric power supplying circuits 111, 121, and 131 and the controllers 110, 120, and 130 respectively correspond to the ports 112, 122, and 132. For example, the first electric power supplying circuit 111 and the controller 110 correspond to the first port 112. The electric power supplying circuit 111 supplies power to the first port 112. The electric power supplying circuit 111 supplies power corresponding to the power receiving device coupled to the port 112. That is, the power from the electric power supplying circuit 111 is supplied to the power receiving device through the port 112.

Likewise, the controller 120 and the second electric power supplying circuit 121 correspond to the second port 122. The electric power supplying circuit 121 supplies power to the second port 122. The electric power supplying circuit 121 supplies power corresponding to the power receiving device coupled to the port 122. That is, the power from the electric power supplying circuit 121 is supplied to the power receiving device through the port 122.

Likewise, the controller 130 and the third electric power supplying circuit 131 correspond to the third port 132. The electric power supplying circuit 131 supplies power to the third port 132. The electric power supplying circuit 131 supplies power corresponding to the power receiving device coupled to the port 132. That is, the power from the electric power supplying circuit 131 is supplied to the power receiving device through the port 132.

The controllers 110, 120, and 130 control their corresponding electric power supplying circuits 111, 121, and 131. That is, the controller 110 controls the supply of power from the electric power supplying circuit 111. Likewise, the controller 120 controls the supply of power from the electric power supplying circuit 121, and the controller 130 controls the supply of power from the electric power supply circuit 131. The controller 110, the controller 120, and the controller 130 control power supply corresponding to the USB PD standard. The electric power supplying circuits 111, 121, and 131 are respectively power supply circuits which generate power corresponding to instructions from the controllers 110, 120, and 130. The controllers 110, 120, and 130 further control data communication (hereinafter called USB PD communication) compliant with the USB PD standard.

The electric power supplying circuits 111, 121, and 131 and the controllers 110, 120, and 130 are provided three by three corresponding to the three ports 112, 122, and 132. Further, the controllers 110, 120, and 130 respectively control power supply in accordance with the power receiving devices coupled to their corresponding ports 112, 122, and 132. Accordingly, the power supplied from the electric power supplying circuits 111, 121, and 131 to the three ports 112, 122, and 132 are independently controlled. The electric power supplying circuits 111, 121, and 131 supply power to their corresponding ports 112, 122, and 132. Thus, the power supplying apparatus 100 is capable of supplying the power suitable for the coupled power receiving devices.

In the present embodiment, the controller 110 serves as a master controller, whereas the controllers 120 and 130 serve as slave controllers. That is, the controller 110 being the master controller controls the controllers 120 and 130 each being the slave controller. The controller 110, the controller 120, and the controller 130 are coupled to each other through a bus line 102. Thus, status changes in the controllers 120 and 130, etc. are notified to the controller 110 through the bus line 102. Further, the controller 110 transmits a command for supplying power to the controllers 120 and 130 through the bus line 102.

Specifically, the controller 110 controls power supply in such a manner that the total supply power of the power supplying apparatus 100 does not exceed a prescribed value. In the present embodiment, the controller 110 controls power supply in such a manner that a total value (i.e., total supply power) of the power supplied from the electric power supplying circuits 111, 121, and 131 to the ports 112, 122, and 132 becomes 100 W or less. That is, the upper limit value of the total supply power of the power supplying apparatus 100 becomes 100 W. The upper limit value (prescribed value) of the total supply power of the power supplying apparatus 100 becomes power suppliable from the power supplying apparatus 100. Incidentally, the upper limit value of the total supply power of the power supplying apparatus 100 is not limited to 100 W. An operation summary will be described below by taking for example a case where the power supplying apparatus 100 is capable of supplying up to 100 W and has three ports 112, 122, and 132.

The controllers 110, 120, and 130 respectively have a communication circuit for conforming to a USB PD/USB Type-C standard, a control circuit for an electric power supplying circuit, an arbitration circuit for power management, and an interface between the controllers for other ports. This arbitration circuit has both of a bus master function and a bus slave function.

In the controller 110 having the master function, the arbitration circuit determines a power distribution, based on a table of power profiles. Here, the table of the power profiles include power profiles of all power receiving devices being in coupling. The controller 110 controls power to be supplied from the electric power supplying circuit 111 in accordance with the power distribution. Further, the controller 110 outputs arbitration signals corresponding to power distributions for the controllers 120 and 130 to the controllers 120 and 130 each being a slave. The controllers 120 and 130 respectively control power to be supplied to the ports 122 and 132 in response to the arbitration signals.

Figure 2:
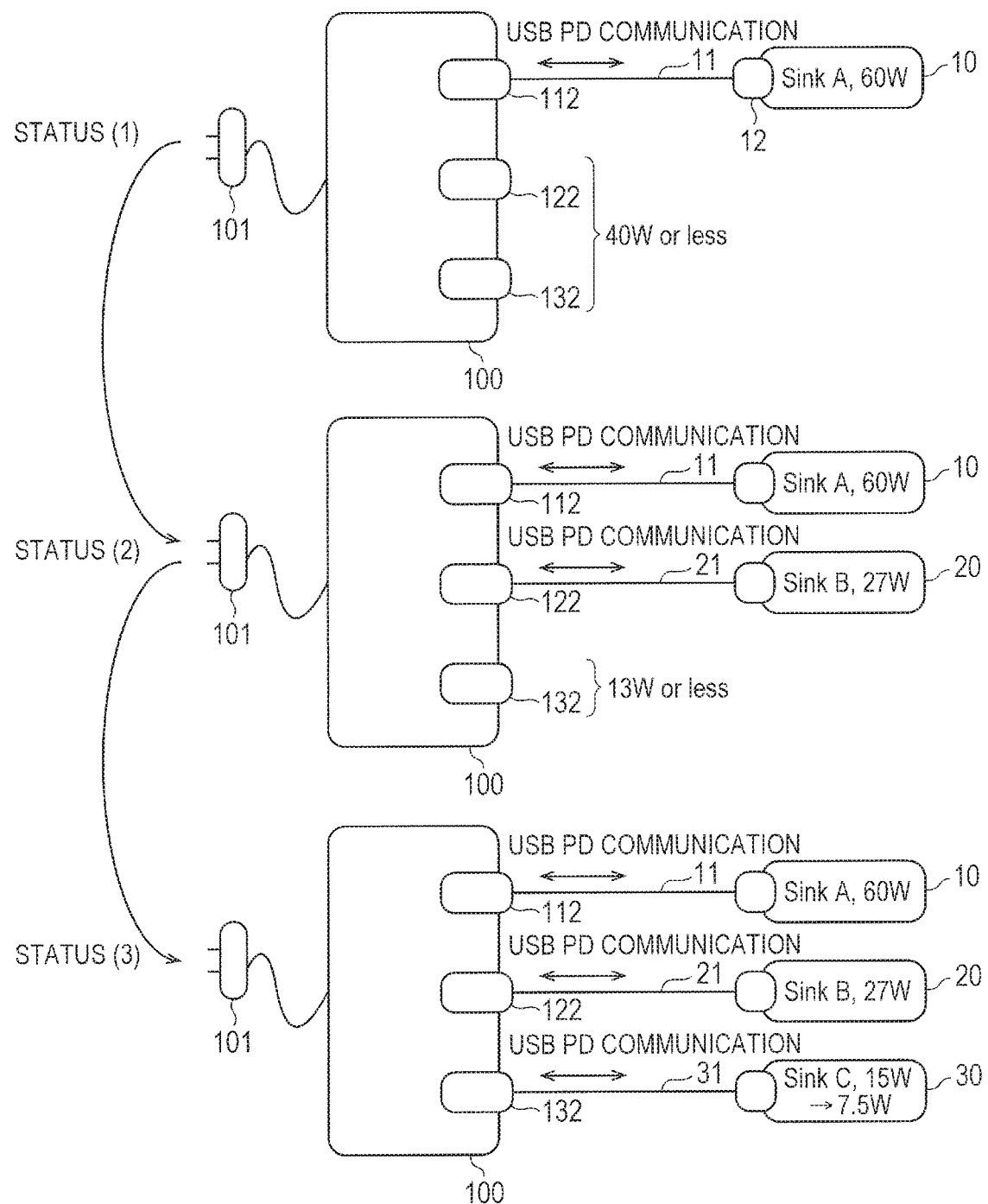
FIG. 2 is a typical diagram showing a configuration in which a power receiving device is coupled to the power supplying apparatus.

A power supplying control method corresponding to a status of coupling of a power receiving device to each of the ports 112, 122, and 132 will next be described using FIG. 2. FIG. 2 shows the configuration of a power supplying system in which each of power receiving devices 10, 20, and 30 is coupled to a power supplying apparatus 100. In FIG. 2, the power receiving devices 10, 20, and 30 are respectively illustrated as Sink A, Sink B, and Sink C.

A description will be made here about power supply control where the power receiving devices 10, 20, and 30 are coupled in the following order of (1), (2), and (3):

(1) The power receiving device 10 is coupled to the port 112.
(2) The power receiving device 20 is coupled to the port 122.
(3) The power receiving device 30 is coupled to the port 132.

Now assumes that the maximum values of power profiles of the power receiving devices 10, 20, and 30 are 60 W, 27 W, and 15 W respectively. When the power receiving devices 10, 20, and 30 are all coupled to the power supplying apparatus 100, and the power supplying apparatus 100 attempts to supply the maximum values of their power profiles, they will exceed a power supply capability 100 W of the power supplying apparatus.

First, in the status of (1), the power receiving device 10 is coupled to the power supplying apparatus 100. The power receiving device 10 is coupled to the port 112 through a USB cable 11. Here, the controller 110 acquires the power profile of the power receiving device 10 through the USB cable 11. Before supplying power to the power receiving device 10, the controller 110 is capable of acquiring the power profile of the power receiving device 10. The controller 110 controls the electric power supplying circuit 111 according to the power profile. Here, the electric power supplying circuit 111 supplies a power of 60 W of the maximum power receiving capability to the power receiving device 10 through the USB cable 11. Since the total supply power of the power supplying apparatus 100 is 60 W, the total supply power does not exceed the prescribed value. Incidentally, the prescribed value is assumed to be the upper limit value 100 W as described above.

Next, in the status of (2), the power receiving device 20 is coupled to the power supplying apparatus 100 in addition to the power receiving device 10. The power receiving device 20 is coupled to the port 122 through a USB cable 21. Here, the controller 120 acquires the power profile of the power receiving device 20 through the USB cable 21. Before supplying power to the power receiving device 20, the controller 120 is capable of acquiring the power profile of the power receiving device 20. The controller 120 controls the electric power supplying circuit 121 according to the power profile. Here, the electric power supplying circuit 121 supplies a power of 27 W of the maximum power receiving capability to the power receiving device 20 through the USB cable 21. Since the total supply power of the power supplying apparatus 100 becomes 87 (=60+27) W, the total supply power does not exceed the prescribed value.

Thereafter, the power receiving device 30 is further coupled to the power supplying apparatus 100 (status of (3)). The power receiving device 30 is coupled to the port 132 through a USB cable 31. Here, the controller 130 acquires the power profile of the power receiving device 30 through the USB cable 31. Before supplying power to the power receiving device 30, the controller 130 is capable of acquiring the power profile of the power receiving device 30. The controller 130 controls the electric power supplying circuit 131 according to the power profile. When the electric power supplying circuit 131 attempts to supply a power of 15 W to the power receiving device 30, the total supply power of the power supplying apparatus 100 becomes 102 (=60+27+15) W and thereby exceeds the prescribed value. Thus, the electric power supplying circuit 131 supplies a power of 7.5 W to the power receiving device 30 through the USB cable 31. With its supply, the total supply power of the power supplying apparatus 100 becomes 94.5 W and hence does not exceed the prescribed value. The total supply power of the power supplying apparatus 100 can be made less than or equal to the power supplying capability of the power supplying apparatus 100.

Figure 3:
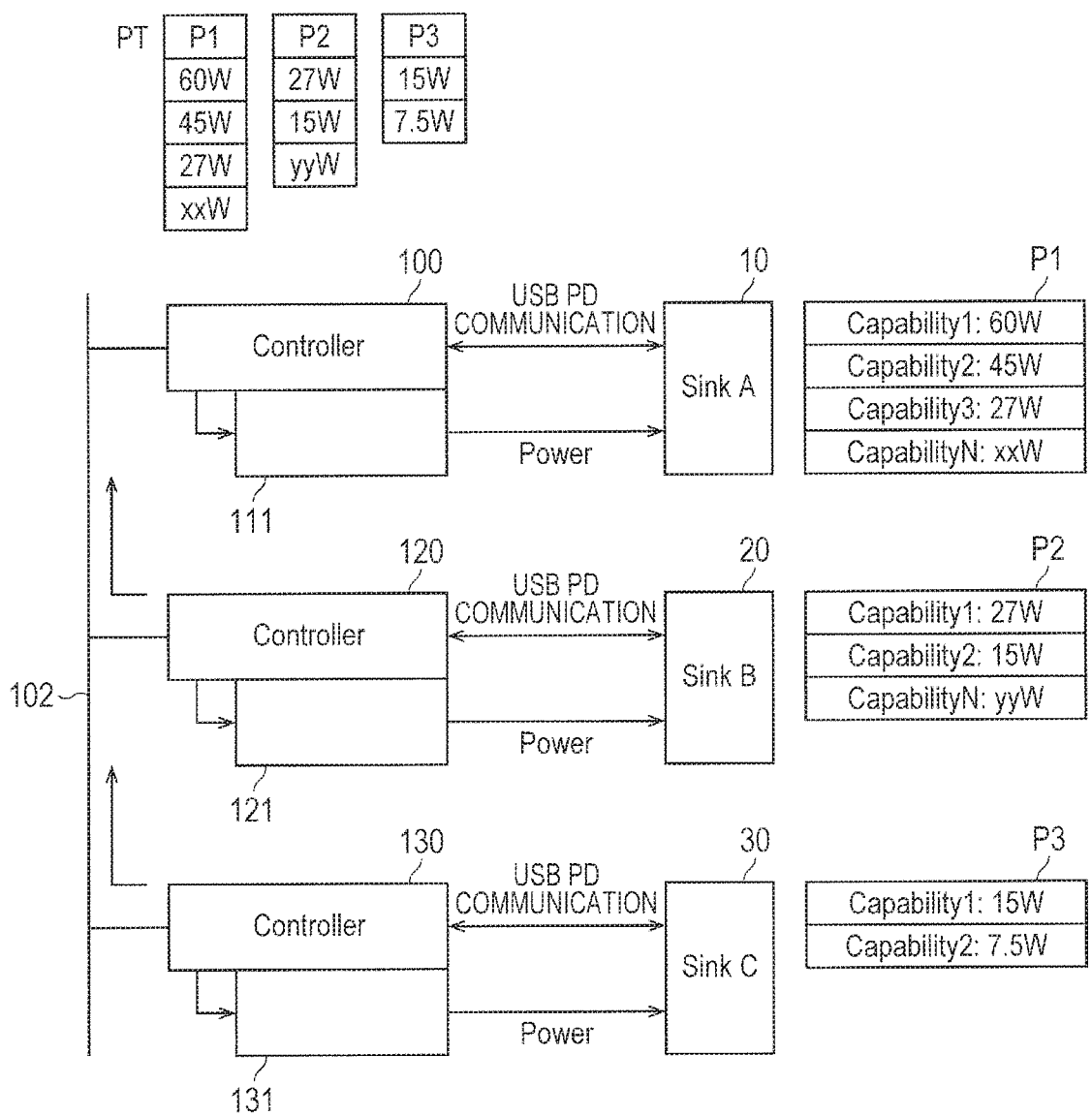
FIG. 3 is a diagram for describing power profiles set for each power receiving device.

Incidentally, although the power receiving devices 10, 20, and 30 are coupled to the ports 112, 122, and 132 through the USB cables 11, 21, and 31 in the above description, the power receiving devices 10, 20, and 30 may be directly connected to the ports 112, 122, and 132. A description will be made here about the power profiles of the power receiving devices 10, 20, and 30 using FIG. 3. The power receiving capability (Capability) corresponding to the power receiving device is set more than one to each power profile. Further, the power profile is set every power receiving device. That is, different power profiles are respectively set to the different power receiving devices.

For example, N (where N is an integer of 1 or more) power receiving capabilities (Capabilities 1 to N) are set to a power profile P1 of the power receiving device 10. They are Capability1=60 W, Capability2=45 W, and Capability3=27 W, and CapabilityN=xxW. The maximum value of the power profile P1, i.e., the maximum power receiving capability of the power receiving device 10 is 60 W. The power receiving device 10 stores the power profile P1 therein. The controller 110 acquires the power profile of the power receiving device 10 through a USB PD communication.

N power receiving capabilities (Capabilities 1 to N) are set to a power profile P2 of the power receiving device 20.

They are Capability1=27 W, Capability2=15 W, and CapabilityN=yyW. The maximum value of the power profile P2, i.e., the maximum power receiving capability of the power receiving device 20 is 27 W. The power receiving device 20 stores the power profile P2 therein. The controller 120 acquires the power profile P2 of the power receiving device 20 through a USB PD communication.

Two power receiving capabilities (Capabilities 1 to N) are set to a power profile P3 of the power receiving device 30. They are Capability1=15 W and Capability2=7.5 W. The maximum value of the power profile P3, i.e., the maximum power receiving capability of the power receiving device 30 is 15 W. The power receiving device 30 stores the power profile P3 therein. The controller 130 acquires the power profile P3 of the power receiving device 30 through a USB PD communication.

The controller 120 transmits the power profile P2 to the controller 110 as a master controller through the bus line 102. Likewise, the controller 130 transmits the power profile P3 to the controller 110 through the bus line 102. The controller 110 lists the power profiles P1 to P3 of all the power receiving devices 10, 20, and 30 to generate a table PT. In the table PT of the power profiles, the power receiving devices and the power receiving capabilities are made to correspond to each other. Specifically, one or two or more power receiving capabilities are made to correspond to one power receiving device.

The controller 110 as the master controller controls the supply of power in such a manner that the total supply power does not exceed the prescribed value. That is, the controller 110 selects the power receiving capability one by one from the power profiles P1 to P3 in such a manner that the total value of power supplied to all the power receiving devices 10, 20, and 30 does not exceed the prescribed value, and outputs an arbitration signal to each of the controllers 120 and 130. Further, the controller 110 also controls the electric power supplying circuit 111 in such a manner that it supplies power of the power receiving capability selected from the power profile P1 in such a manner that the total supply power of the power supplying apparatus does not exceed the prescribed value.

In the above description, the controller 110 controls the electric power supplying circuit 111 in such a manner that it supplies a power of Capability1=60 W of the power profile P1. Thus, the electric power supplying circuit 111 supplies the power of 60 W to the power receiving device 10. The controller 110 outputs an arbitration signal to the controller 120 to supply Capability1=27 W of the power profile P2. The controller 120 controls the electric power supplying circuit 121, based on the arbitration signal to supply the power of 27 W to the power receiving device 20. The controller 110 outputs an arbitration signal to the controller 130 to supply Capability2=7.5 W of the power profile P3. The controller 130 controls the electric power supplying circuit 131, based on the arbitration signal to supply the power of 7.5 W to the power receiving device 30.

Thus, the controller 110 decides a power distribution by referring to the table for the power profiles P1 to P3 of all the power receiving devices 10, 20, and 30. That is, the controller 110 controls the total supply power from the power supplying apparatus 100 so as not to exceed the prescribed value. For example, the upper limit value of the total supply power of the power supplying apparatus 100 may be set to the controller 110 which serves as the master controller. It is possible to efficiently design the power supplying apparatus 100 based on the USB PD standard. Thus, it is possible to avoid exceeding the upper limit value of the power supplied from the power supplying apparatus 100. The power supply corresponding to the USB PD (Power Delivery) standard can suitably be controlled.

For example, under the USB PD standard, the power can be supplied up to 100 W per port. However, when it is so designed that the power can always be supplied up to 100 W at all the ports, it leads to a rise in cost. Also, when the capability is fixed every port, the convenience of a user is impaired. Accordingly, it is possible to supply suitable power according to the coupled power receiving device by providing the above configuration. Further, it is possible to provide the function of optimizing power supplied to each port without using an additional controller. Thus, it is possible to perform design good in efficiency while suppressing the cost. Also, the power supply corresponding to the USB PD (Power Delivery) standard can suitably be controlled.

Figure 4:
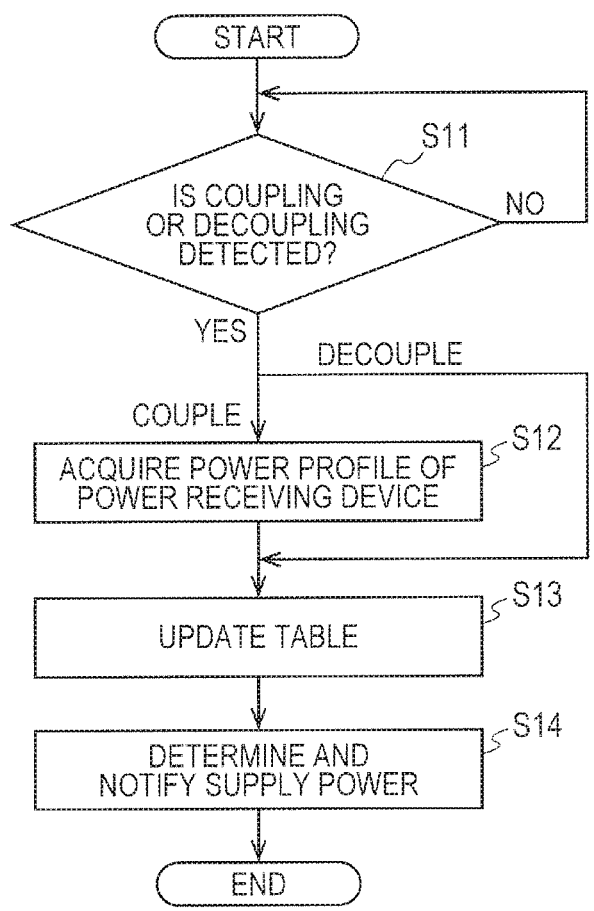
FIG. 4 is a flowchart showing the operation of a master controller.
Figure 5:
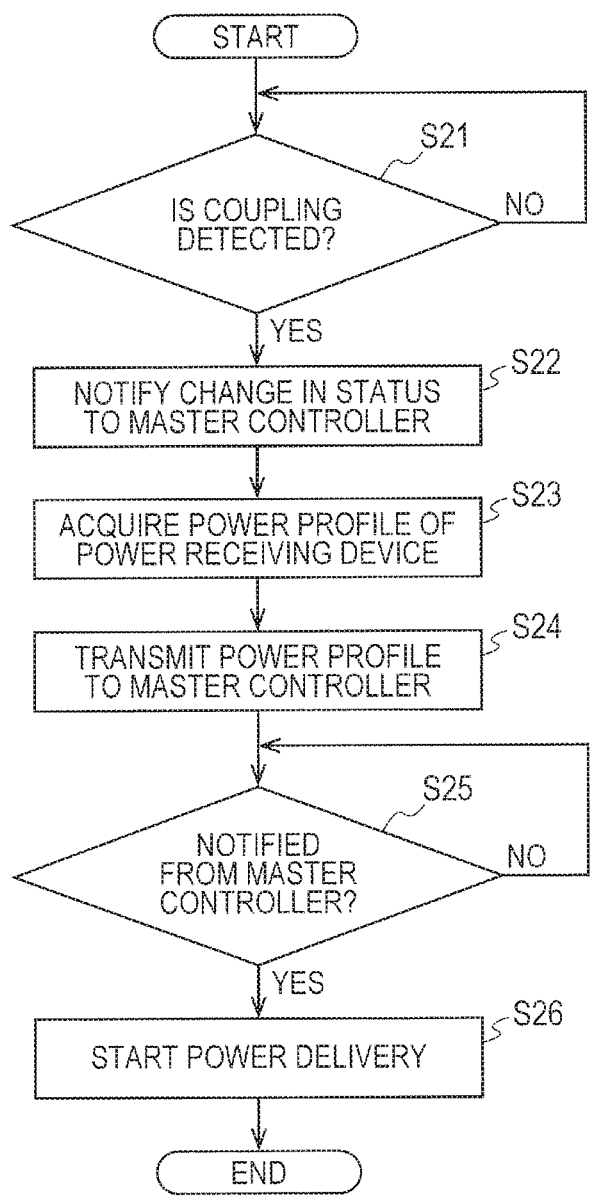
FIG. 5 is a flowchart showing the operation of a slave controller where a power receiving device is coupled.
Figure 6:
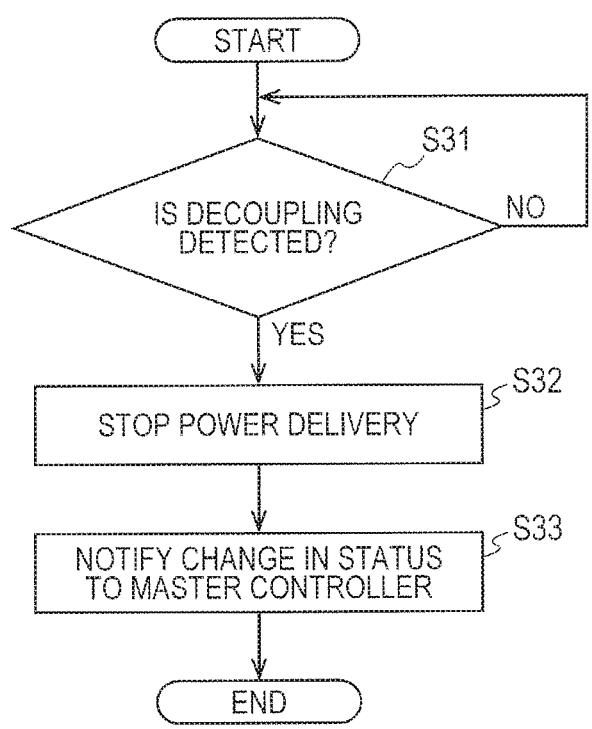
FIG. 6 is a flowchart showing the operation of a slave controller where the coupling thereof to the power receiving device is decoupled.

A power supplying control method according to the present embodiment will be described below with reference to FIGS. 4 to 6. FIG. 4 is a flowchart showing the operation of the controller 110 being the master controller. FIGS. 5 and 6 are flowcharts showing the operations of the controllers 120 and 130 each being the slave controller.

The operation of the controller 110 will first be described using FIG. 4. First, the controller 110 detects whether coupling of the power receiving device 10, the power receiving device 20 or the power receiving device 30, or decoupling of its coupling is performed (S11). When the coupling or its decoupling is not detected (NO of S11), the controller 110 repeats the processing of S11 until the coupling or its decoupling is detected.

When the coupling or its decoupling is detected (YES of S11), the controller 110 acquires a power profile of a power receiving device (S12). Then, the controller 110 updates a table for power profiles (S13). That is, when a power receiving device is newly coupled, the controller 110 adds a power profile of the newly coupled power receiving device to the table. On the other hand, when the coupling is decoupled, the controller 110 removes the power profile of the decoupled power receiving device from the table.

Then, the controller 110 decides power to be supplied to each port, based on the table for the power profiles and notifies the same to the electric power supplying circuit 111, the controller 120, and the controller 130 (S14). Thereby, it is possible to supply power corresponding to the updated table to the power receiving device being in coupling. Thus, the table is updated upon insertion and removal of the power receiving device. Accordingly, when the power receiving device is coupled and the coupling of the power receiving device is decoupled, the power to be supplied can be controlled in such a manner that an appropriate power receiving capability is set.

The operations of the controllers 120 and 130 will next be described using FIGS. 5 and 6. Incidentally, since the controller 120 and the controller 130 are of the slave controllers which perform the same operation, the controller 120 will be described as performing the processing in the following description.

A description will first be made using FIG. 5 about the operation when the power receiving device 20 is coupled to the port 122. It is first determined whether the controller 120 detects the coupling of the power receiving device 20 to the port 122 (S21). When the coupling is not detected (NO of S21), the controller 120 repeats the processing of S21 until the coupling is detected.

When the coupling of the power receiving device 20 is detected (YES of S21), the controller 120 notifies to the controller 110 being the master controller that the status has changed (S22). The controller 110 is capable of detecting the coupling or decoupling according to the notice of S22 as indicated in S11 of FIG. 4. Then, the controller 120 acquires the power profile P2 from the power receiving device 20 through a USB PD communication (S23). The controller 120 transmits the power profile P2 to the controller 110 being the master controller through the bus line 102 (S24). The controller 110 is capable of acquiring the power profile according to the transmission in Step S24 as indicated in S12 of FIG. 4.

Next, the controller 120 determines whether the notice from the controller 110 being the master controller is received (S25). When the notice from the controller 110 is not received (NO of S25), the controller 120 stands by until it receives the notice from the controller 110. When the notice from the controller 110 is received (YES of S25), the controller 120 starts the feeding of power to the power receiving device 20 with the notified power of power receiving capability. That is, according to the notice in S14 of FIG. 4, the power receiving capability determined corresponding to the table PT for the power profiles, e.g., Capability1=27 W is notified to the controller 120. The controller 120 controls the electric power supplying circuit 121 to supply the power of 27 W to the power receiving device 20 through the port 122. Thus, the controller 120 controls the supply of power from the electric power supplying circuit 121 in accordance with the instruction from the controller 110.

A description will next be made using FIG. 6 about processing where the coupling of the power receiving device 20 is decoupled. The controller 120 detects whether the coupling of the power receiving device 20 is decoupled (S31). When the decoupling thereof is not detected, the processing of S31 is repeated until the decoupling is detected. That is, the controller 120 assumes a status of supplying the power corresponding to the power receiving capability set to the power profile P2. When the decoupling is detected, the controller 120 stops the supply of power to the power receiving device 20 (S32). Then, the controller 120 notifies to the controller 110 being the master controller that the status has changed (S33). The controller 110 is capable of detecting the coupling or decoupling according to the notice of S33 as indicated in S11 of FIG. 4.

Thus, the controllers 110, 120, and 130 at the ports 112, 122, and 132 respectively have the function of performing arbitration thereamong in such a manner that the supply of power is not performed beyond the power supplying capability of the entire power supplying apparatus 100. The controllers 110, 120, and 130 respectively supply the optimum power to the ports by using their arbitrating functions within a range in which the total supply power does not exceed the prescribed value. That is, the controller 110 controls the supply of power in such a manner that the total supply power of the power supplying apparatus 100 does not exceed the prescribed value. It is possible to efficiently design the multi-port power supplying apparatus 100 based on the USB PD standard in which a large power of 100 W can be supplied at maximum per port.

Under the USB PD standard, the power receiving devices and the power supplying apparatus can support a plurality of power profiles. Therefore, the power profile is held for each power receiving device. Accordingly, upon coupling of each power receiving device, the controller 110 being the master controller acquires the power profile through the use of the USB PD communication. The controller 110 lists the power profiles of all the power receiving devices and stores the same as a table. For example, when the power receiving device 10 is coupled to the port 112 assigned to the controller 110 itself, the controller 110 stores the power profile P1 of the power receiving device 10 therein. When the power receiving devices 20 and 30 are coupled to the ports 122 and 132 assigned to the controllers 120 and 130 as the slave controllers, the controllers 120 and 130 transmit the power profiles P2 and P3 to the controller 110. The controller 110 stores the power profiles P2 and P3 therein.

The controller 110 generates a table, based on the power profiles P1 to P3 of all the power receiving devices being in coupling and decides a power distribution on the basis of the table. Then, the table for the power profiles is updated upon insertion and removal of the power receiving device. When the power to be supplied to the port 112 is changed, the controller 110 controls the supply of power from the electric power supplying circuit 111. When the power to be supplied to each of the ports 122 and 132 is changed, the controller 110 transmits an arbitration signal corresponding to the power distribution to the controllers 120 and 130 through the bus line 102. Then, the controllers 120 and 130 respectively control the supply of power from the electric power supplying circuits 121 and 131.

The controller 110 determines whether the total supply power where the power of the maximum power receiving capability in each power profile is supplied exceeds the prescribed value (upper limit value). That is, the controller 110 compares the total supply power and the prescribed value (100 W in the above example) with the total value of the maximum power receiving capabilities of all the power profiles as the total supply power. Then, the power supplied to one or more power receiving devices is restricted when the total supply power exceeds the prescribed value. Specifically, the power of the power receiving capability other than the maximum power receiving capability of each power profile is supplied to one or two or more power receiving devices.

Thus, the controller 110 decides the power distribution to the power receiving device being in coupling. Various methods can be taken to decide the power distribution by the controller 110. For example, the controller 110 may decide the power distribution according to the coupling order of the power receiving devices.

More specifically, the controller 110 selects a small power receiving capability from a power profile of a newly-coupled power receiving device (power receiving device 30 in the above example) and sets the total supply power so as not to exceed the prescribed value.

Alternatively, the controller 110 selects a small power receiving capability from the power profile of the already-coupled power receiving device (power receiving device 10 or 20 in the above example) and sets the total supply power so as not to exceed the prescribed value. That is, the controller 110 controls the power supplied to the already-coupled power receiving device to be lowered. The priority of power supply may be lowered as the previously coupled power receiving device is taken. In this case, the newly coupled power receiving device is supplied with the power of the maximum power receiving capability.

Further, when the total supply power exceeds the prescribed value even if the minimum power receiving capability of the power profile is selected, the controller 110 may select one to stop the power feeding from within one or plural power receiving devices. For example, when the total supply power at the time that the minimum power receiving capability of the power profile is supplied to each of all the power receiving devices exceeds the prescribed value, the controller 110 controls the supply of power to one or more power receiving devices to be stopped. For example, as to a battery-operable power receiving device, the controller 110 stops the supply of power thereto.

When the power receiving device is decoupled, the table for each power profile is updated, and the power to the power receiving device being during power supply is made optimum. By doing like this, high power can quickly be supplied to the power receiving device whose power supply has been restricted or stopped.

Incidentally, the power receiving capabilities set to the power profiles P1 to P3, and the number of the power receiving capabilities are not limited to the above values. Of course, the number of the ports in the power supplying apparatus 100, and the total supply power are not limited to the above values either.

The controller 110 being the master controller, and the controllers 120 and 130 being the slave controllers can be made equal to each other in configuration. That is, the controller 110, the controller 120, and the controller 130 respectively have the same circuit configuration. Accordingly, an arbitration circuit unit to be described later has both of a master function and a slave function. When the controllers 110, 120, and 130 are incorporated in the power supplying apparatus 100, one controller is assigned to the master controller, and other controllers are assigned to the slave controllers. The arbitration circuit unit is operated according to the functions assigned to the controllers.

Incidentally, although the above description has been made about the example in which when the total supply power does not exceed the prescribed value, the power supplying apparatus 100 supplies power with the maximum power receiving capability of each power profile, the power supplying apparatus 100 may supply the power receiving capability other than the maximum power receiving capability of each power profile. One or more of the power receiving devices 10, 20, and 30 may require the power supplying apparatus 100 to provide required power other than the maximum power receiving capability. For example, the power receiving devices 10, 20, and 30 require the power supplying apparatus 100 to provide the power receiving capability other than the maximum power receiving capability of each power profile as required power. The power supplying apparatus 100 acquires the power profile of each power receiving device and the required power. Further, when the total value of the required power exceeds the prescribed value, the power supplying apparatus 100 performs the above arbitration.

Therefore, the controllers 110, 120, and 130 respectively have coupling terminals for the master function and coupling terminals for the slave function. Further, the coupling terminals corresponding to the assigned function are coupled to the bus line 102 and other circuits. By doing like this, it is possible to switch the functions assigned to the controller according to the design or the like of the controller 110. Thus, the versatility of the controller 110 can be enhanced. For example, even when the power supplying apparatuses 100 different in the number of ports are designed, controllers can all be comprised of a slave controller, and master controllers can be comprised of controllers having the same circuit configuration. Incidentally, the assignment of the master function or the slave function to the controller may be switched depending on the coupling state of the coupling terminals. Alternatively, the master function or the slave function may be assigned by writing the same in firmware of the controller.

Embodiment 2

The present embodiment will describe a specific example for changing the priority of the supply of power to each power receiving device. Incidentally, although a plurality of specific examples for changing the priority will be described with being divided into some in the following description, the specific examples can also be combined appropriately.

Figure 7:
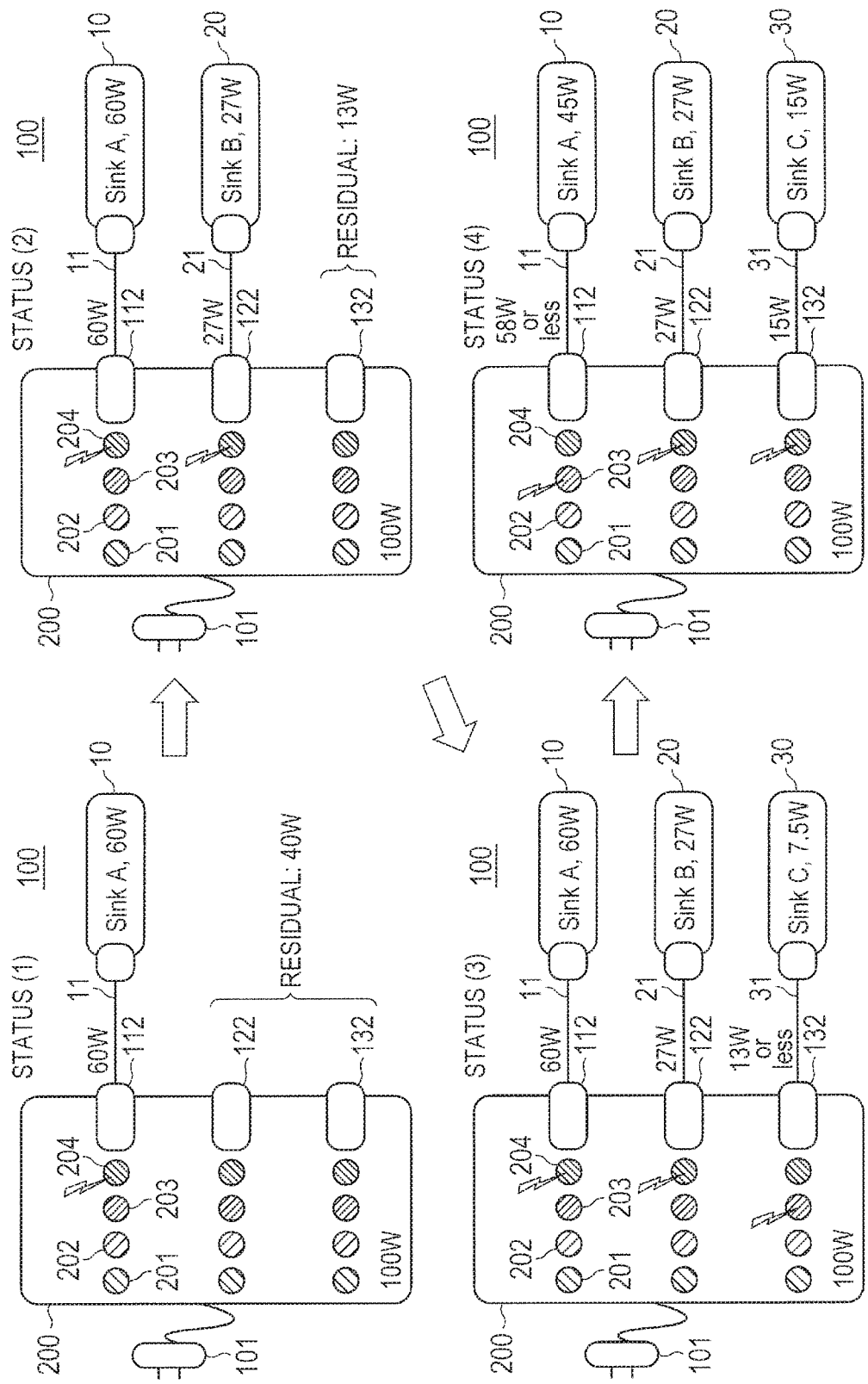
FIG. 7 is a typical diagram showing a configuration in which power receiving devices are coupled to a power supplying apparatus according to an embodiment 2.
Figure 8:
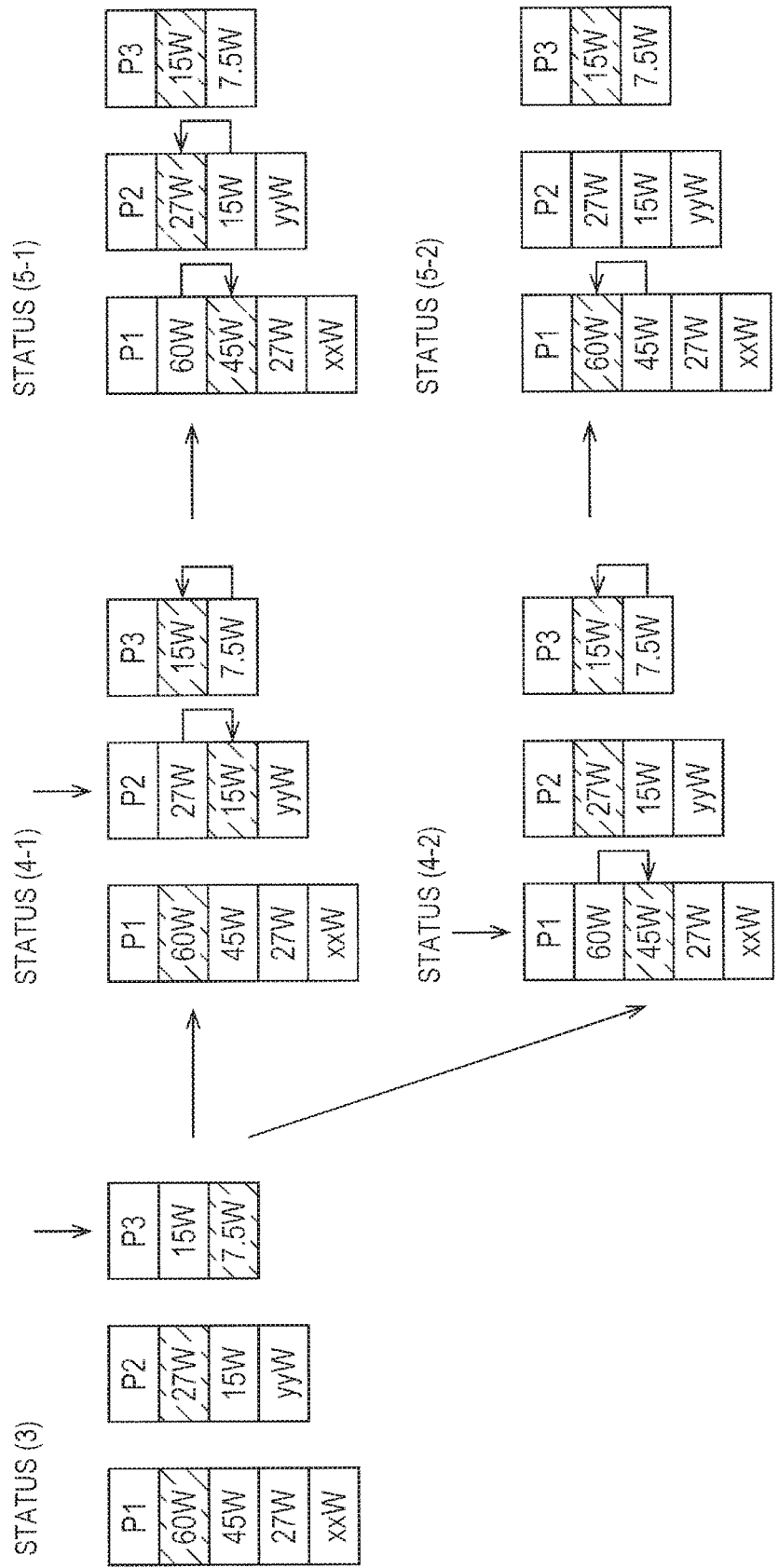
FIG. 8 is a diagram for describing a control method according to the embodiment 2.

A description will first be made about an example in which the priority is changed by a user operation. The configuration and operation of a power supplying apparatus 100 will be described using FIG. 7. FIG. 7 is a diagram for describing the configuration of the power supplying apparatus 100 and its operation. FIG. 8 is a diagram showing a change in power receiving capability selected from a table for power profiles.

A description will first be made about the configuration of the power supplying apparatus 100 according to the present embodiment. As shown in FIG. 7, in the present embodiment 2, an interface 200 is added to the power supplying apparatus 100 shown in the embodiment 1. Incidentally, since the present power supplying apparatus is similar to the power supplying apparatus 100 shown in the embodiment 1 in terms of configurations other than the interface 200, the description thereof will appropriately be omitted. For example, since controllers 110, 120, and 130 and electric power supplying circuits 111, 121, and 131 are similar to those in the embodiment 1, their illustration is omitted. Further, in FIG. 7, as with the embodiment 1, a power receiving device 10 is shown as Sink A, a power receiving device 20 is shown as Sink B, and a power receiving device 30 is shown as Sink C.

The interface 200 is a user interface which indicates the present power-supplied state to a user and accepts the change of priority of each power receiving device from the user. Specifically, the interface 200 has a selection button 201, a stop lamp 202, a limiting lamp 203, and a power feeding lamp 204. The selection button 201, the stop lamp 202, the limiting lamp 203, and the power feeding lamp 204 are provided for every ports 112, 122, and 132. That is, the interface 200 has the three selection buttons 201, the three stop lamps 202, the three limiting lamps 203, and the three power feeding lamps 204.

The selection button 201 is an input interface which accepts a user input. For example, the priority of power supply to the power receiving device can be changed by pressing the selection button 201 by the user. For example, as described above, the selection button 201 corresponds to each of the ports 112, 122, and 132. It is possible to prioritize the supply of power to the port 112 by pressing the selection button 201 corresponding to the port 112 by the user. In this case, the power supply is performed with the maximum power receiving capability (60 W in FIG. 8) of power receiving capabilities (60 W, 45 W, 27 W, and xxW in FIG. 8) set to a power profile P1 of the power receiving device 10 corresponding to the port 112. Of course, the input interface may be comprised of an interface other than the button, e.g., a switch, a touch panel or the like.

The stop lamp 202, the limiting lamp 203, and the power feeding lamp 204 are respectively an output interface for notifying the status of power supply to each of the ports 112, 122, and 132 to the user. For example, the stop lamp 202, the limiting lamp 203, and the power feeding lamp 204 can be comprised of an LED (Light Emitting Diode) or the like. More specifically, the stop lamp 202 emits light in red, the limiting lamp 203 emits light in yellow, and the power feeding lamp 204 emits light in red. Incidentally, the output interface is not limited to the lamp, but may be an LCD (Liquid Crystal Panel) monitor or the like.

As described above, the stop lamp 202, the limiting lamp 203, and the power feeding lamp 204 are provided for one port 122. Further, when the power receiving device is coupled to one port, the stop lamp 202, the limiting lamp 203, and the power feeding lamp 204 are operated according to the status of power supply to the power receiving device. One of the stop lamp 202, the limiting lamp 203, and the power feeding lamp 204 is turned on according to the status of power supply to the power receiving device, and the remaining two thereof are turned off. That is, one lamp is selectively lit according to the status of power supply to the power receiving device.

Specifically, when the power of the maximum power receiving capability (60 W in FIG. 7) of the power profile P1 of the power receiving device 10 is supplied to the port 112, the power feeding lamp 204 is turned on. When the power (45 W, 27 W or xxW in FIG. 7) other than the maximum power receiving capability of the power profile P1 of the power receiving device 10 is supplied to the port 112, the limiting lamp 203 is turned on. When no power is supplied to the port 112, the stop lamp 202 is turned on. Incidentally, when no power receiving device is coupled to the port 112, all of the stop lamp 202, the limiting lamp 203, and the power feeding lamp 204 are turned off.

The stop lamp 202, the limiting lamp 203, and the power feeding lamp 204 are similarly operated even with respect to the ports 122 and 132. Thus, the user is able to grasp the status of power supply of each port. The user recognizes that the power supply to the power receiving device whose power supply is desired to be prioritized is stopped or restricted. Then, the user is able to prioritize the power supply to the power receiving device by pressing the selection button 201 corresponding to the power receiving device. For example, when the power receiving device is equipped with a battery and the residual amount of the battery is low, the user changes the priority and thereby is able to perform charging at high speed.

There are shown in FIG. 7, examples in which the operation is performed in the following order of (1) to (4):
(1) The power receiving device 10 is coupled to the port 112,
(2) The power receiving device 20 is coupled to the port 122,
(3) The power receiving device 30 is coupled to the port 132, and
(4) The priority is changed by the button operation of the user.

Incidentally, since the present embodiment is similar to the embodiment 1 in terms of the operations of (1) to (3), their detailed description will be omitted. A description will be made only about the operations of the stop lamp 202, the limiting lamp 203, and the power feeding lamp 204.

In the status of (1), only the power receiving device 10 is coupled to the power supplying apparatus 100. Further, since the power receiving device 10 is supplied with a power of the maximum power receiving capability (60 W) of the power profile P1, the power feeding lamp 204 corresponding to the port 112 is turned on. The power receiving devices 20 and 30 are not coupled to the ports 122 and 132. Thus, the stop lamp 202, the limiting lamp 203, and the power feeding lamp 204 corresponding to each of the ports 122 and 132 are all turned off.

In the status of (2), the power receiving devices 10 and 20 are coupled to the power supplying apparatus 100. Further, since the power receiving device 10 is supplied with a power of the maximum power receiving capability (60 W) of the power profile P1, the power feeding lamp 204 corresponding to the port 112 is turned on. Since the power receiving device 20 is supplied with a power of the maximum power receiving capability (27 W) of the power profile P2, the power feeding lamp 204 corresponding to the port 122 is turned on. The power receiving device 30 is not coupled to the port 132. Thus, the stop lamp 202, the limiting lamp 203, and the power feeding lamp 204 corresponding to the port 132 are all turned off.

In the status of (3), the power receiving device 10, the power receiving device 20, and the power receiving device 30 are coupled to the power supplying apparatus 100. Further, since the power receiving device 10 is supplied with the power of the maximum power receiving capability (60 W) of the power profile P1, the power feeding lamp 204 corresponding to the port 112 is turned on. Since the power receiving device 20 is supplied with the power of the maximum power receiving capability (27 W) of the power profile P2, the power feeding lamp 204 corresponding to the port 122 is turned on. Since the power receiving device 30 is supplied with a power of a power receiving capability (7.5 W) other than the maximum power receiving capability (15 W) of a power profile P3, the limiting lamp 203 corresponding to the port 132 is turned on.

In the status of (3), the power supply to the port 132 is not prioritized. When it is desired to prioritize the power supply to the port 132, the user depresses the selection button 201 corresponding to the port 132. Thus, the power supply to the port 132 is prioritized, thereby resulting in the status of (4). Here, the status of the power supply to each of the ports 132 and 112 changes.

In the status of (4), since the power receiving device 30 is supplied with the power of the maximum power receiving capability (15 W) of the power profile P3, the power feeding lamp 204 corresponding to the port 132 is turned on. Further, the controller 110 lowers the power to be supplied to the power receiving device 10 in such a manner that the total supply power of the power supplying apparatus 100 does not exceed the prescribed value (100 W). Here, since the power receiving device 10 is supplied with a power of a power receiving capability (45 W) other than the maximum power receiving capability (60 W) of the power profile P1, the limiting lamp 203 corresponding to the port 112 is turned on. Incidentally, since the power of the maximum power receiving capability (27 W) of the power profile P2 is supplied to the power receiving device 20, the power feeding lamp 204 corresponding to the port 122 is turned on.

Providing the interface 200 in this manner enables the user to change the status of power supply. Thus, the user is able to increase the power to be supplied to the power receiving device whose power supply is desired to be prioritized. In the status of (4) in FIG. 7, the user is able to supply the power of the maximum power receiving capability of the power profile P3 to the power receiving device 30 whose power supply is desired to be prioritized.

Incidentally, the switching of the priority of the power supply is not limited to the example shown in the status of (4) in FIG. 7. For example, the priority may be switched according to the order that the selection button 201 is pressed. Alternatively, the priority other than that for the power receiving device in which the selection button 201 is pressed may be decided according to battery information about the battery of the power receiving device. Otherwise, the priority other than that for the power receiving device in which the selection button 201 is pressed may be decided according to the coupled order of the power receiving devices. An example in which the priority is switched is shown in FIG. 8.

First, a status of (3) in FIG. 8 assumes a power supply status similar to the status of (3) in FIG. 7. That is, powers of 60 W, 27 W, and 7.5 W are supplied to the power receiving devices 10, 20, and 30. Here, the power receiving devices 10 and 20 respectively correspond to the maximum power receiving capabilities of power profiles P1 and P2. Incidentally, the power profiles P1 to P3 are similar to those in the embodiment 1.

A description will next be made about a case where in the status of (3), the priority of power supply to the port 112 is higher than that of power supply to the port 122. In this case, the power supplying apparatus 100 sequentially changes from the status of (3) to a status of (4-1) and a status of (5-1). Here, for example, the priority of the power supply is decided according to the coupled order of the power receiving devices.

Specifically, in the status of (3), the user pushes the selection button 201 corresponding to the port 132 to prioritize the power feeding of the power receiving device 30. Thus, as in the status of (4-1), the power to be supplied to the power receiving device 30 rises from 7.5 W to 15 W, and the power to be supplied to the power receiving device 20 is lowered from 27 W to 15 W. For example, since the power receiving device 10 is coupled prior to the power receiving device 20, the controller 110 lowers the power of the power receiving device 20.

Even in a state in which the maximum power receiving capability of the power profile P3 is supplied to the power receiving device 30, the controller 110 lowers the power supplied to the port 122 low in priority such that the total supply power of the power supplying apparatus 100 does not exceed 100 W. Thus, the power of the power receiving capability (15 W) other than the maximum power receiving capability (45 W) of the power profile P2 is supplied to the power receiving device 20. At this time, the power receiving device 10 remains unchanged while being supplied with the maximum power receiving capability (60 W) of the power profile P1.

Further, at the time of the status of (4-1), the user depresses the selection button 201 corresponding to the port 122 to raise the priority of the port 122. Then, the priority of the port 122 becomes higher than that for the port 112. Thus, as in the status of (5-1), the power to be supplied to the power receiving device 20 rises from 15 W to 27 W, and the power to be supplied to the power receiving device 10 is lowered from 60 W to 45 W. That is, the controller 110 lowers the power of the power receiving device 10 corresponding to the port 112 at which the selection button 201 is not depressed.

Even in a state in which the maximum power receiving capability of the power profile P2 is supplied to the power receiving device 20, the controller 110 lowers the power to be supplied to the port 112 low in priority such that the total supply power of the power supplying apparatus 100 does not exceed 100 W. Thus, the power of the power receiving capability (45 W) other than the maximum power receiving capability (60 W) of the power profile P1 is supplied to the power receiving device 10. At this time, the power receiving device 30 remains unchanged while being supplied with the maximum power receiving capability (15 W) of the power profile P3.

A description will next be made about a case where in an initial state, the power supply to the port 122 is higher in priority than that for the port 112. In this case, the power supplying apparatus 100 sequentially changes from the status of (3) to a state of (4-2) and a state of (5-2). Here, for example, the priority is decided according to battery information.

Specifically, in the status of (3), the user pushes the selection button 201 corresponding to the port 132 to prioritize the power feeding of the power receiving device 30. Thus, as in the status of (4-2), the power to be supplied to the power receiving device 30 rises from 7.5 W to 15 W, and the power to be supplied to the power receiving device 10 is lowered from 60 W to 45 W. For example, the power to be supplied to the power receiving device 10 is lowered to prioritize the power supply of the power receiving device 20 low in battery remaining amount.

Even in a state in which the power of the maximum power receiving capability of the power profile P3 is supplied to the power receiving device 30, the controller 110 lowers the power supplied to the port 112 low in priority such that the total supply power of the power supplying apparatus 100 does not exceed 100 W. Accordingly, the power of the power receiving capability (45 W) other than the maximum power receiving capability (60 W) of the power profile P1 is supplied to the power receiving device 10. At this time, the power receiving device 20 remains unchanged while being supplied with the maximum power receiving capability (27 W) of the power profile P2.

Further, at the time of the status of (4-2), the charging of the power receiving device 20 is assumed to have finished. Accordingly, the user depresses the selection button 201 corresponding to the port 112 is depressed to raise the priority of the port 112. Then, the priority of the port 112 becomes higher than that for the port 122. Thus, as in the status of (5-2), the power to be supplied to the power receiving device 10 rises from 45 W to 60 W, and the supply of power to the power receiving device 20 is stopped. That is, the battery stops the power feeding to the charged power receiving device 20.

Even in a state in which the power of the maximum power receiving capability of the power profile P1 is supplied to the power receiving device 10, the controller 110 lowers the power to be supplied to the port 122 low in priority such that the total supply power of the power supplying apparatus 100 does not exceed 100 W. At this time, the power receiving device 30 remains unchanged while being supplied with the maximum power receiving capability (15 W) of the power profile P3. Incidentally, though the supply of power to the power receiving device 20 is stopped here, the power of the power receiving capability (15 W) other than the maximum power receiving capability (27 W) of the power profile P2 may be supplied to the power receiving device 20.

The provision of the input interface like the selection button 201 in this way enables the user to supply the power of the maximum power receiving capability to the power receiving device whose power feeding is desired to be prioritized. Also, the user is able to easily grasp the current power receiving state by providing the output interfaces like the stop lamp 202, the limiting lamp 203, and the power feeding lamp 204. Further, the controller 110 receives therein a notice about a user input from each of other controllers 120 and 130. Furthermore, since the controller 110 decides the power distribution according to the user input, it can easily perform the control on the supply of power.

(Modification 1)

Figure 9:
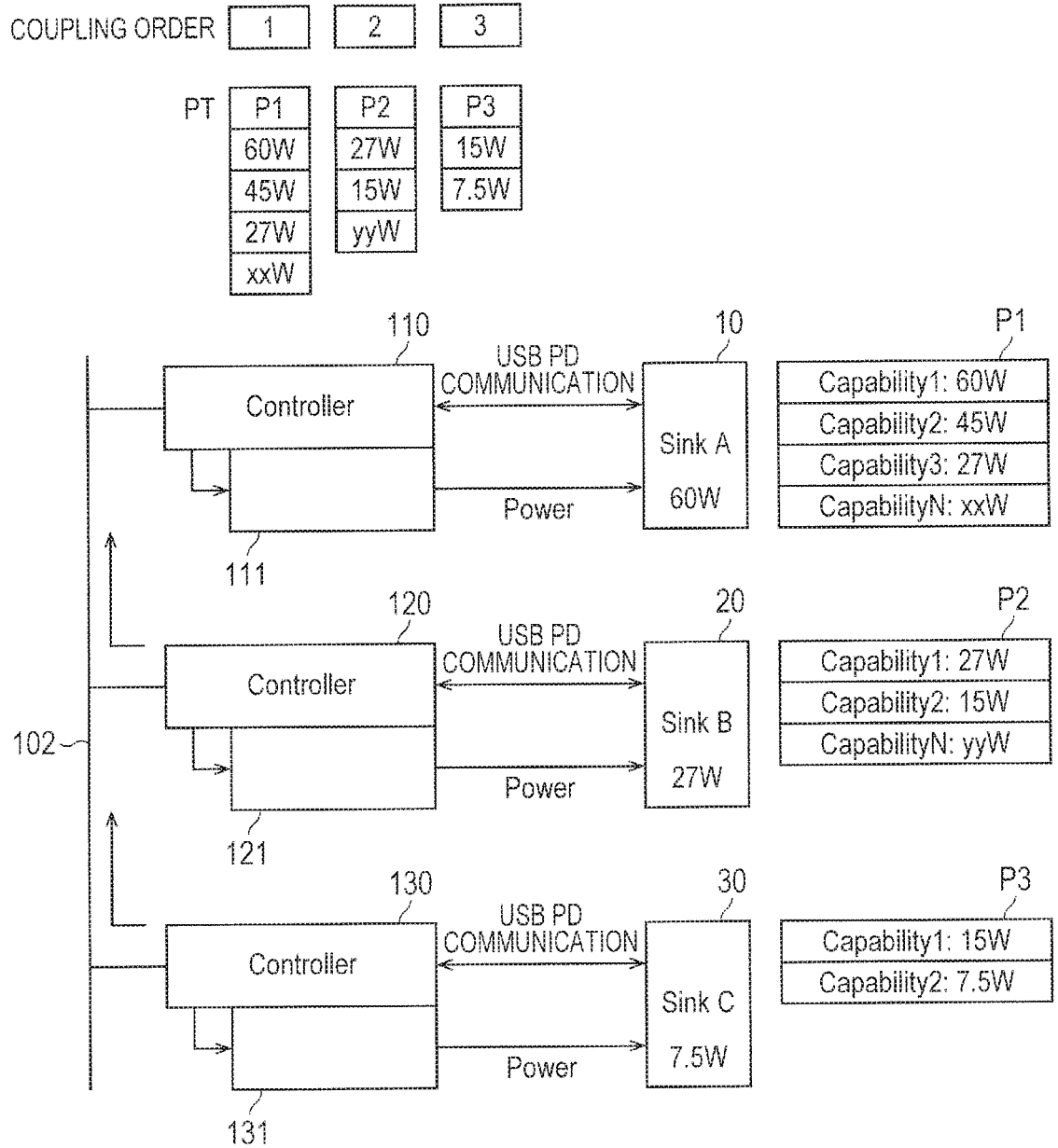
FIG. 9 is a diagram for describing a modification 1 which determines the priority of power supply according to a coupling order.

In a modification 1, the priority of the supply of power to each power receiving device is decided in the coupling order thereof. FIG. 9 is a diagram for describing the modification 1 in which the priority is determined in the order of coupling of the power receiving devices. Incidentally, since the basic configuration of a power supplying apparatus 100 and processing thereof overlap with the above contents, their description will appropriately be omitted.

As shown in FIG. 9, a controller 110 holds the coupling order of the power receiving devices. Here, the coupling order for the power supplying apparatus 100 is assigned as the power receiving device 10, the power receiving device 20, and the power receiving device 30. Incidentally, the coupling order of the power receiving device 10 most newly coupled to the power supplying apparatus 100 is assumed to be 1. The coupling order of the power receiving device 30 coupled most before, i.e., in the earliest time is assumed to be 3. Further, the controller 110 controls supply power in such a manner that the priority becomes high as the coupling order gets more recent.

Accordingly, the powers of the maximum power receiving capability (60 W) and the maximum power receiving capability (27 W) are respectively supplied to the power receiving device 10 and the power receiving device 20. The power receiving device 30 is supplied with a power of a power receiving capability (7.5 W) other than the maximum power receiving capability (15 W). By doing like this, the total supply power can be controlled so as not to exceed a prescribed value.

Incidentally, the controller 110 may be notified of the controllers 120 and 130 being coupled to the power receiving devices or their coupling being cut off in the timing at which the power receiving devices are inserted into or extracted from the ports. That is, when the notice in S22 of FIG. 5 or S33 of FIG. 6 is made, the controller 110 may update the coupling order. The controller 110 may store the coupling order in a memory or a register. Thus, it is possible to appropriately control the power feeding. Of course, the priority for the power feeding may be made high as the power supplying apparatus gets older in terms of coupling.

(Modification 2)

Figure 10:
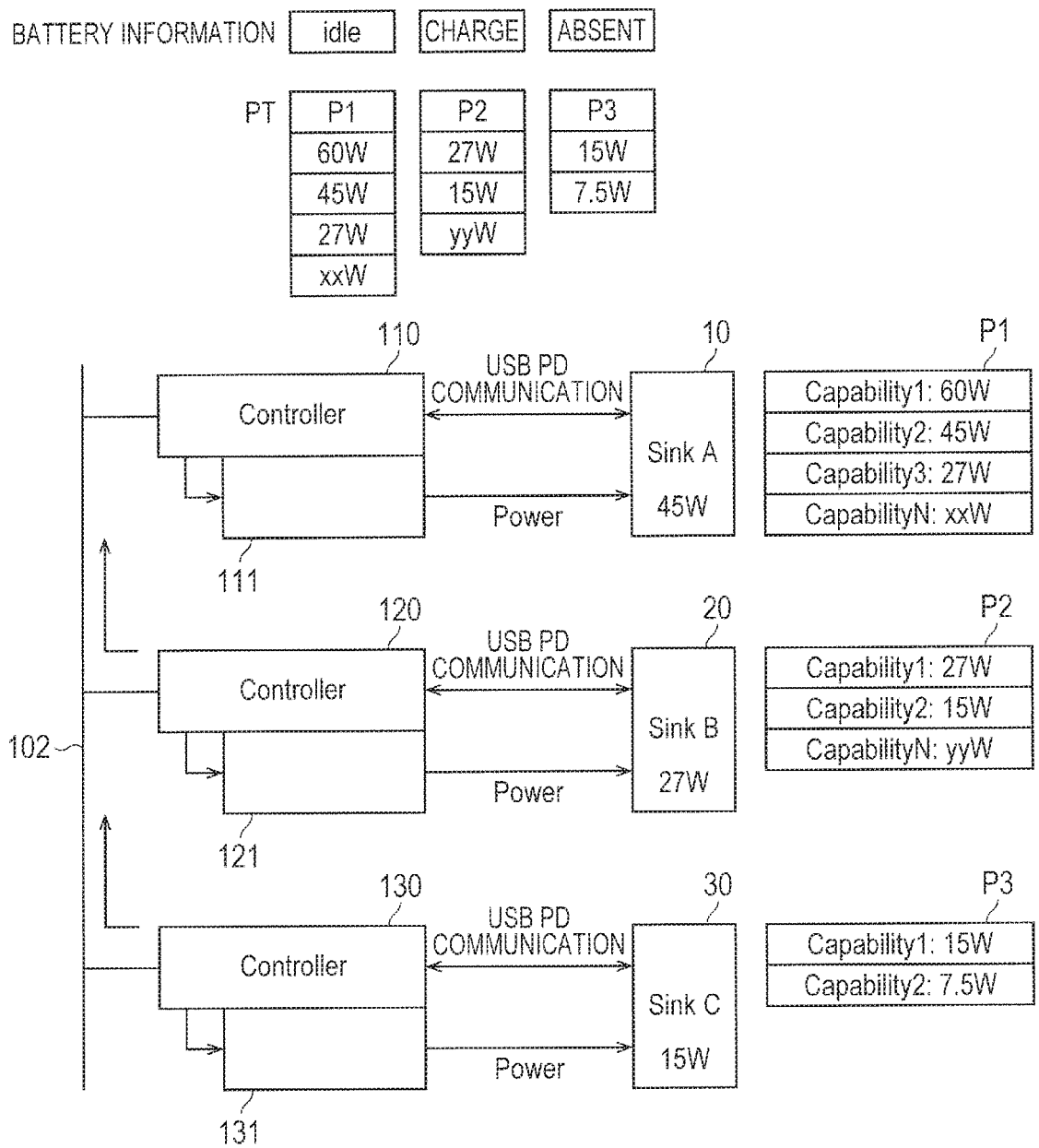
FIG. 10 is a diagram for describing a modification 2 which determines the priority of power supply according to battery information.

In a modification 2, the priority of the supply of power to each power receiving device is decided based on battery information. FIG. 10 is a diagram for describing the modification 2 which decides the priority, based on the battery information. Incidentally, since the basic configuration of a power supplying apparatus 100 and processing thereof overlap with the above contents, their description will appropriately be omitted.

As shown in FIG. 10, the battery information is held in a controller 110. Here, the battery information includes battery presence/absence information indicative of the presence/absence of a battery of a power receiving device connected to its corresponding port. For example, since a power receiving device 30 is not equipped with a battery, there is no battery information.

Also, as to each of power receiving devices 10 and 20 each equipped with a battery, its battery information includes battery residual amount information corresponding to the residual amount of the battery. The charging of the battery in the power receiving device 10 is completed. That is, since the battery thereof is being fully charged, the battery information is represented as Idle. On the other hand, since the battery of the power receiving device 20 is on charge, the battery information is represented as charge. That is, the battery residual amount information is information indicative of whether the charge is finished.

Here, the controller 110 controls the power receiving device 30 equipped with no battery in such a manner that its power supply is performed most preferentially. That is, since the power receiving devices 10 and 20 each equipped with the battery can be battery-operated, the power supply of the power receiving device 30 equipped with no battery is prioritized. Next, the controller 110 controls the power supply of the power receiving device 30 to be performed in preference to the power receiving device 20 being on charge. The power receiving device 10 whose charge has been completed is most lowered in priority. That is, the priority of the power supply is the order of the power receiving device 30, the power receiving device 20, and the power receiving device 10.

The power receiving device 30 having no battery is supplied with a power of the maximum power receiving capability (15 W). Further, the priority of the power receiving devices 10 and 20 each having the battery is decided according to the battery residual amount. Here, the priority of the power receiving device 20 low in battery residual amount is higher than that for the power receiving device 10 high in battery residual amount. The power receiving device 30 and the power receiving device 20 are respectively supplied with powers of the maximum power receiving capability (15 W) and the maximum power receiving capability (27 W). The power receiving device 10 is supplied with a power of a power receiving capability (45 W) other than the maximum power receiving capability (60 W). By doing like this, the total supply power can be controlled so as not to exceed a prescribed value. It is thus possible to more suitably perform power feeding control.

Incidentally, although the battery residual amount information is represented as two types indicative of during charging and the completion of power reception in the above description, the controller 110 may acquire the battery residual amount as numerical values of 0 to 100%. Further, the priority of power supply to the power receiving device large in battery residual amount may be lowered.

Further, the battery residual amount of each of the power receiving devices 10 and 20 each having the battery may be updated on a regular basis. In this case, for example, the controllers 110 and 120 respectively regularly acquire the battery residual amounts of the power receiving devices 10 and 20. Then, the controller 120 regularly transmits the battery residual amount of the power receiving device 20 to the controller 110. Further, the controller 110 regularly updates the battery information according to the acquired battery residual amounts of the power receiving devices 10 and 20.

Incidentally, the battery presence/absence information may be acquired when coupling the power receiving device. Further, the battery residual amount information may also be acquired only when coupling the power receiving device. Of course, the timing at which the battery information is acquired and updated is not limited in particular. Further, when the power receiving device is equipped with the battery, the battery information may include the battery residual amount information indicative of the residual amount of the battery. That is, in the power receiving devices each having the battery, the battery residual amount information is held correspondingly to the battery presence/absence information. In the present modification 2, since the priority is determined according to the battery information, control on the power feeding can be appropriately performed.

Figure 11:
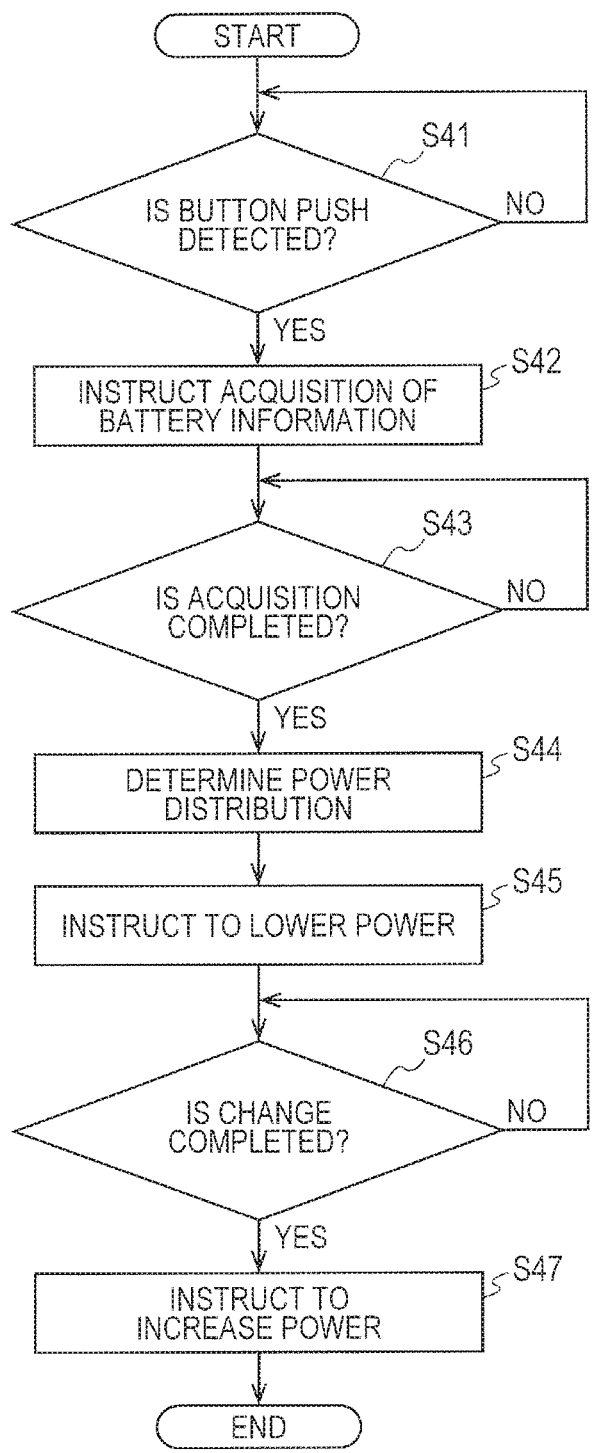
FIG. 11 is a flowchart showing the operation of a master controller.
Figure 12:
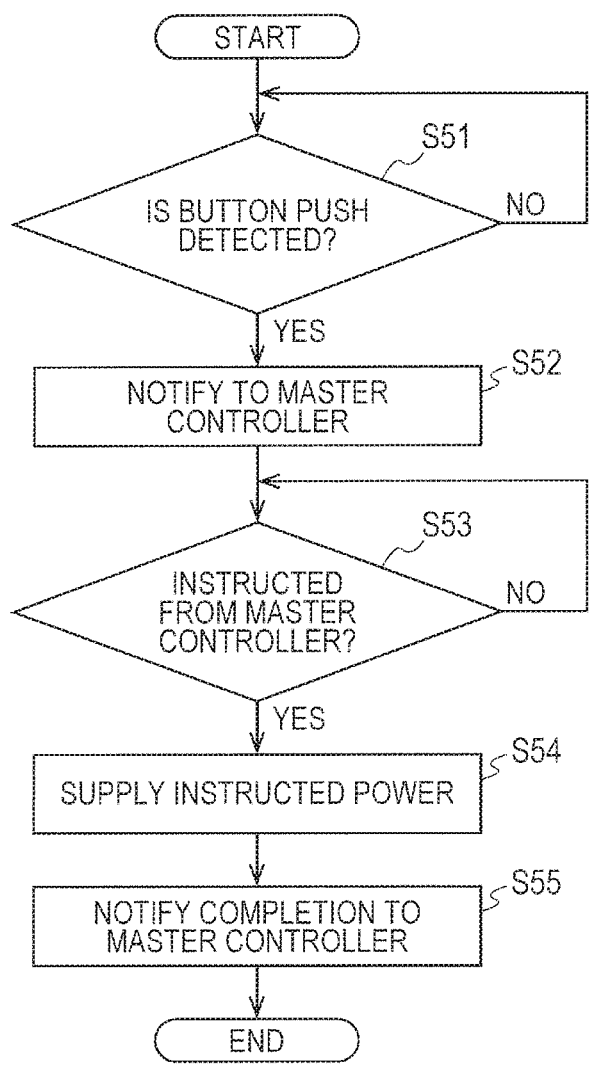
FIG. 12 is a flowchart showing the operation of a slave controller when the priority is raised.
Figure 13:
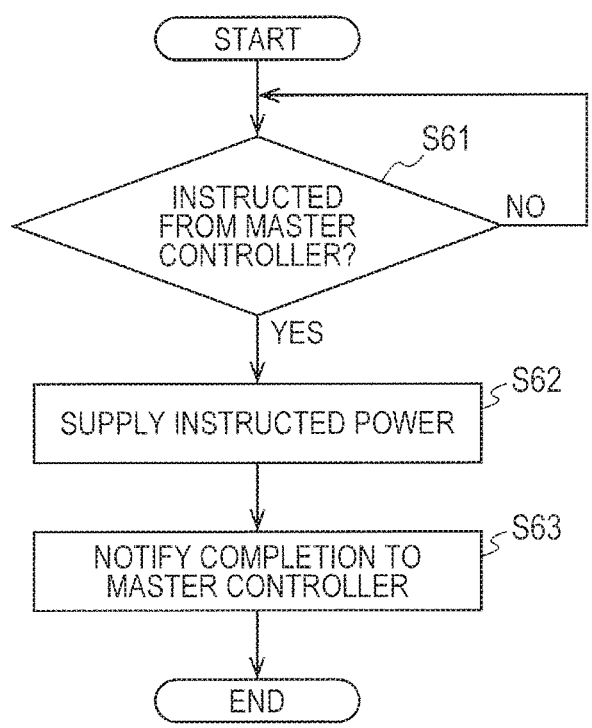
FIG. 13 is a flowchart showing the operation of the slave controller when the priority is lowered.

A power supplying control method according to the present embodiment will next be described using FIGS. 11 to 13. FIGS. 11 to 13 are respectively flowcharts showing processing of switching the priority by the selection button 201. FIG. 11 is a flowchart showing the operation of the controller 110 being the master controller. FIGS. 12 and 13 are flowcharts showing the operations of the controllers 120 and 130 being the slave controllers. Incidentally, since the basic processing of each of the controllers 110, 120, and 130 is similar to that in the embodiment 1, the description thereof will appropriately be omitted.

The operation of the controller 110 will first be described using FIG. 11. A description will be made here about an example in which the controller 110 decides a power distribution according to a user input and battery information. Specifically, with the power supply to the port at which the selection button is depressed being given top priority, the controller 110 decides priority to the ports other than that by referring to the battery information. First, the controller 110 determines whether the button push of the selection button 201 corresponding to each of the ports 112, 122, and 132 is detected (S41). When the button push is not detected (NO of S41), the controller 110 repeats the processing of S41 until it is detected that the selection button is depressed.

When the button push is detected (YES of S41), the controller 110 outputs an instruction for acquiring battery information to the controllers 120 and 130 (S42). Then, it is determined whether the acquisition of the battery information from the controllers 120 and 130 each being the slave controller is completed (S43).

When the acquisition of the battery information from the controllers 120 and 130 is not completed (NO of S43), the controller 110 repeats the processing of S43 until the acquisition is completed. That is, the controller 110 stands by until it receives battery presence/absence information and battery residual amount information from the controllers 120 and 130. The controller 110 also acquires the battery information of the power receiving device 10.

When the acquisition of the battery information of all power receiving devices is completed (YES of S43), the controller 110 decides a power distribution (S44). Specifically, the controller 110 decides the power distribution in such a manner that the power supply to the port at which the selection button 201 is depressed is prioritized. Thus, the port at which the selection button 201 is depressed is supplied with the power of the maximum power receiving capability of the power profile. As to each port at which the selection button 201 is not depressed, the priority thereof is decided based on the battery information.

Further, the controller 110 performs an instruction for lowering the power (S45). For example, when the power to the ports 122 and 132 is lowered, the controller 110 outputs an arbitration signal to the controllers 120 and 130 to perform an instruction for lowering the power. When the power to the port 112 is lowered, the controller 110 controls the electric power supplying circuit 111 to lower the power. The controller 110 determines whether the total supply power of the power supplying apparatus 100 exceeds a prescribed value. When the total supply power exceeds it, the controller 110 may perform an instruction for lowering the power to be supplied to the power receiving device low in priority.

Next, the controller 110 determines whether the change of power is completed (S46). When a notice about the completion of its change from each of the controllers 120 and 130 or the electric power supplying circuit 111 is not received (NO of S46), the processing of S46 is repeated until the change is completed. That is, the controller 110 stands by until the notice about the change completion is received.

When the change is completed (YES of S46), the controller 110 performs an instruction for increasing the power (S47). For example, when the power supplied to the ports 122 and 132 is increased, the controller 110 outputs an arbitration signal to the controllers 120 and 130 to instruct to increase the power. Further, when the power to the port 112 is increased, the controller 110 controls the electric power supplying circuit 111 to increase the power. Thus, the total supply power of the power supplying apparatus 100 is controlled so as not to exceed the prescribed value.

The operations of the controllers 120 and 130 each being the slave controller will next be described using FIG. 12. Incidentally, since the controllers 120 and 130 are of the slave controllers which perform the same operation, only the operation of the controller 120 will be described in the following description.

FIG. 12 is a flowchart showing the operation of the controller 120 for increasing the power when the selection button 201 is depressed. The controller 120 determines whether the button push of the selection button 201 corresponding to the port 112 is detected (S51).

When the button push is not detected (NO of S51), the controller 120 repeats the processing of S51 until the button push is detected. When the button push is detected (YES of S51), the controller 120 notifies to the controller 110 of the master that the button push has been detected (S52). Thus, the controller 110 can determine in S41 of FIG. 11 whether the detection of the button push is performed. Further, in S52, the controller 120 may notify battery information to the controller 110. Thus, in S42 of FIG. 11, the controller 110 is capable of acquiring the battery information.

Next, the controller 120 determines whether an instruction from the controller 110 of the master is issued (S53). That is, it is determined whether the instruction for increasing the power in S47 of FIG. 11 is issued. Since the selection button 201 corresponding to the port 122 is depressed here, the power supply to the power receiving device 20 is prioritized.

When the instruction is not issued (NO of S53), the controller 120 repeats the processing of S53 until the instruction is issued. Thus, the controller 120 does not change the power until the instruction from the controller 110 is received. That is, the controller 120 does not increase power to be supplied until the power supplied to other ports is lowered.

When the instruction is issued (YES of S53), the controller 120 supplies the instructed power (S54). That is, the controller 120 controls the electric power supplying circuit 121 and thereby supplies the power corresponding to the power distribution to the power receiving device 20. Then, the controller 120 notifies to the controller 110 that the power is changed (S55).

The operations of the controllers 120 and 130 as the slave controllers will next be described using FIG. 13. Incidentally, since the controllers 120 and 130 are of the slave controllers which perform the same operation, only the operation of the controller 120 will be described in the following description.

FIG. 13 is a flowchart showing the operation of the controller 120 for lowering the power where the selection button 201 corresponding to the port 112 is not depressed. First, the controller 120 determines whether an instruction from the controller 110 being the master controller is issued (S61). That is, the controller 120 determines whether the instruction for lowering the power in S45 of FIG. 11 is issued. Since the selection button 201 corresponding to the port 122 is not depressed here, the priority of power supply to the power receiving device 20 is lowered.

When no instruction is issued (NO of S61), the controller 120 repeats the processing of S61 until the instruction is issued. Thus, the controller 120 does not change the power until the instruction from the controller 110 is received. When the instruction is issued (YES of S61), the controller 120 supplies the instructed power (S54). That is, the controller 120 controls the electric power supplying circuit 121 and thereby supplies power corresponding to the power distribution to the power receiving device 20. Thus, the electric power supplying circuit 121 lowers the power supplied to the power receiving device 20.

Then, the controller 120 notifies to the controller 110 that the power is changed (S63). Thereby, the controller 110 is capable of detecting that the change is completed in S46. Thus, the supply of power can be controlled based on the user input and the battery information. It is therefore possible to appropriately control the supply of power.

(Modification 3)

Figure 14:
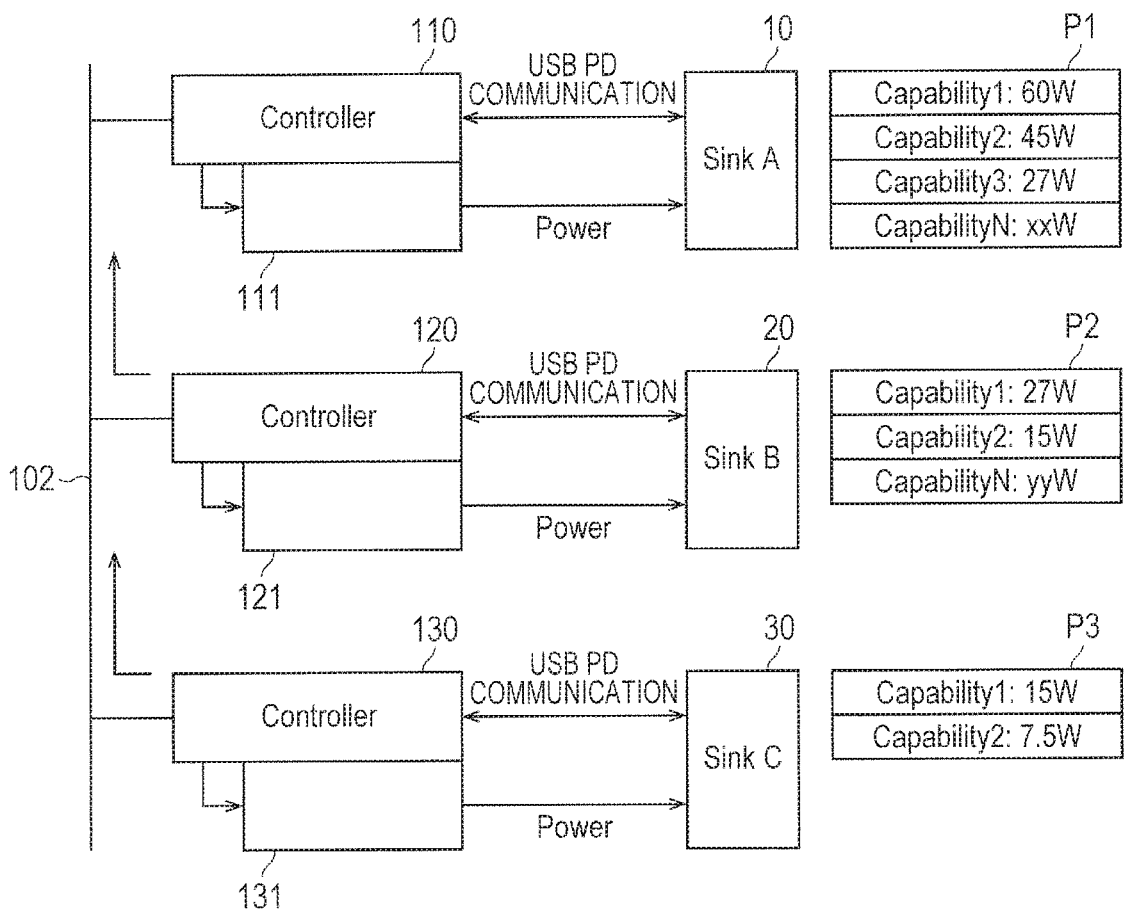
FIG. 14 is a diagram for describing a modification 3 which determines the priority of power supply according to battery presence/absence information and battery residual amount information.

In a modification 3, the priority is decide based on battery information. FIG. 14 is a diagram typically showing the configuration of a power supplying apparatus 100 according to the modification 3. The battery information includes battery presence/absence information and battery residual amount information of a corresponding power receiving device. The battery information is information indicative of the presence or absence of a battery. The battery residual amount information is information indicative of the residual amount of the battery and is represented in numerical values between 0% and 100%. Incidentally, 100% indicates the complete charging (full charge).

Then, the priority of power supply to a power receiving device low in battery residual amount is raised. Accordingly, in FIG. 14, the priority of the power supply is the order of a power receiving device 30, a power receiving device 20, and a power receiving device 10. By doing like this, the power receiving device low in battery residual amount can be quickly charged.

Further, a controller 110 may supply a power of the minimum power supply capability in a power profile to the power receiving device close to the full charge. For example, when the charging of the power receiving device 30 is completed in a power profile P1 shown in FIG. 14, the controller 110 controls an electric power supplying circuit 111 to supply a power of xxW. By doing like this, much more power can be distributed to the power receiving device low in battery residual amount.

Figure 15:
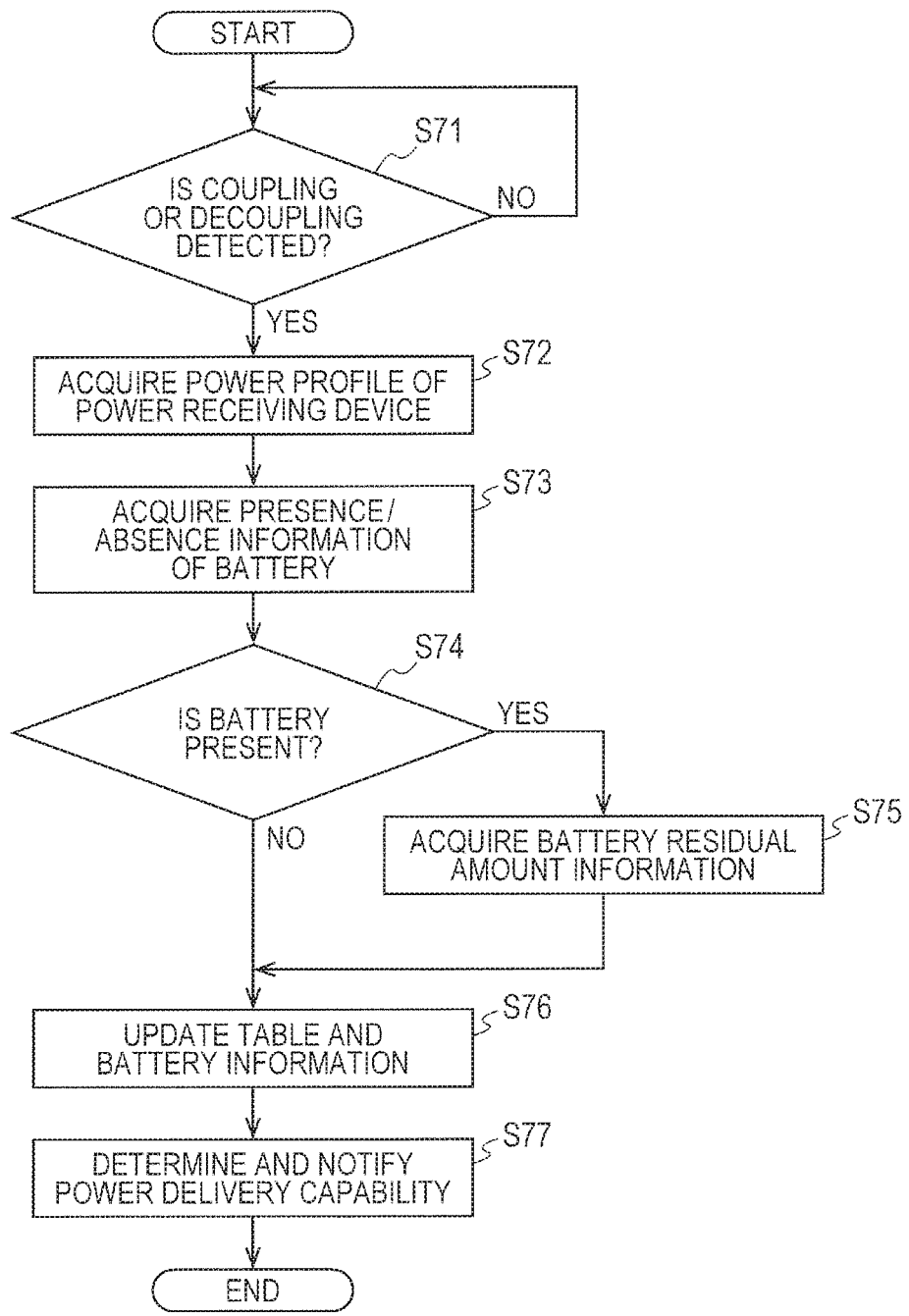
FIG. 15 is a flowchart showing the operation of a master controller in a power supplying control method according to a modification 3.
Figure 16:
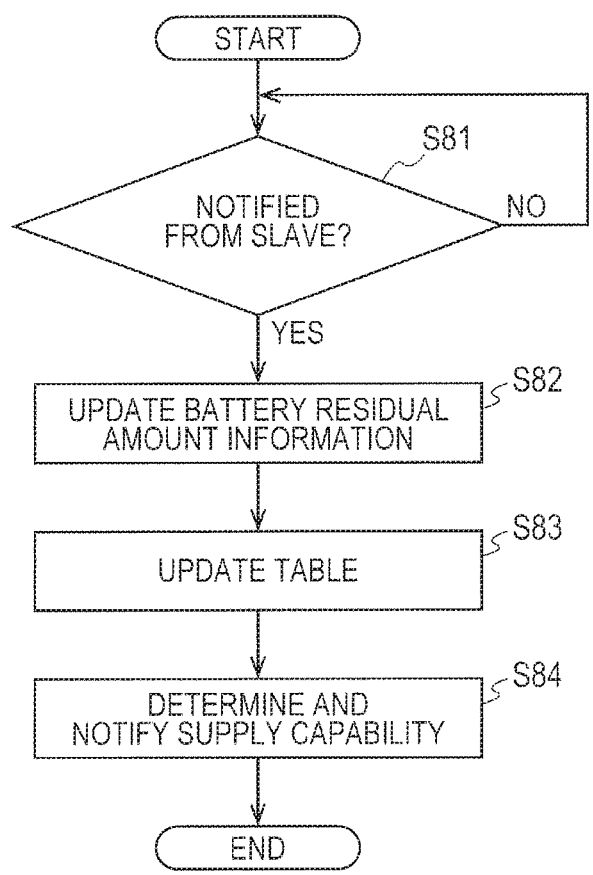
FIG. 16 is a flowchart showing the operation of the master controller when the battery residual amount information is updated.
Figure 17:
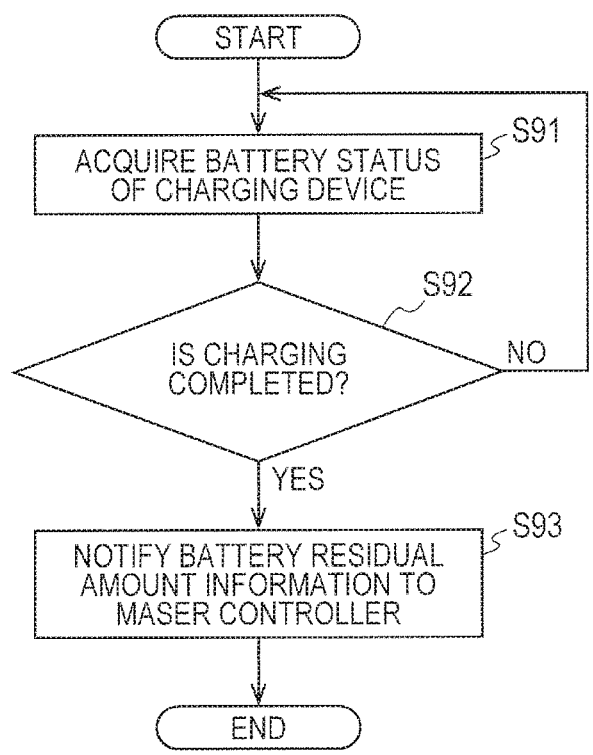
FIG. 17 is a flowchart showing the operation of a slave controller.

FIGS. 15 to 17 are respectively flowcharts showing a power supplying control method according to the modification 3. The operation of the controller 110 will first be described using FIG. 15. FIG. 15 is a flowchart showing the operation when the power receiving device is coupled to the power supplying apparatus 100.

First, the controller 110 detects whether the coupling of the power receiving device 10, the power receiving device 20 or the power receiving device 30 or decoupling of the coupling is performed (S71). When the coupling or the decoupling is not detected (NO of S71), the controller 110 repeats the processing of S71 until the coupling or decoupling is detected.

When the coupling or decoupling is detected (YES of S71), the controller 110 acquires a power profile of the coupled power receiving device (S72). Further, the controller 110 acquires battery presence/absence information of the newly coupled power receiving device (S73). The controller 110 determines based on the battery presence/absence information whether a battery is present (S74). When the battery is present in the power receiving device (YES of S74), the controller 110 acquires battery residual amount information (S75).

When the battery residual amount information is acquired in S75 or there is no battery in the power receiving device (NO of S74), the controller 110 updates a table and battery information (S76). Then, the controller 110 decides power to be supplied to each port, based on the updated table and battery information and notifies the same to the electric power supplying circuit 111, controller 120 and controller 130 (S77). Thereby, it is possible to supply the power corresponding to the updated table and battery information to the power receiving device being in coupling. Thus, it is possible to supply appropriate power to each port.

The operation of the controller 110 for updating battery residual amount information in the case where the power receiving device is not inserted/extracted will next be described using FIG. 16. First, the controller 110 determines whether a notice from the controller 120 or 130 is received (S81). When the notice is not received (NO of S81), the controller 110 repeats the determination of S81.

When the notice is received (YES of S81), the controller 110 updates a battery residual amount (S82). Then, the controller 110 updates a table (S83). Based on the table and the battery information, the controller 110 decides power to be supplied to each port and notifies the same to the electric power supplying circuit 111, controller 120 and controller 130 (S84). Thereby, the controller 110 is capable of supplying the power corresponding to the updated battery information to the power receiving device being in coupling. Thus, the appropriate power can be supplied to each port.

Incidentally, the notice of the battery residual amount information from the controller 120 or 130 may be performed on a regular basis. Alternatively, when the charging is completed or when a charging state in which the residual amount is equal to or greater than a threshold is reached, the controllers 120 and 130 may notify the battery residual amount information.

FIG. 17 is a flowchart showing the operation of the controller 120 as the slave. FIG. 17 is a flowchart showing the operation where the controllers 120 and 130 notify the battery residual amount information to the controller 110 when the charging is completed. Incidentally, since the controllers 120 and 130 are operated in the same manner, the operation of the controller 120 will be described in the following description.

First, the controller 120 acquires a battery residual amount of the power receiving device 20 through a USB PD communication (S91). Then, the controller 120 determines whether the charging of the power receiving device 20 is completed (S92). When the charging is not completed (NO of S92), the controller 120 returns to S91 and acquires battery residual amount information. When the charging is completed (YES of S92), the controller 120 notifies the battery residual amount information to the controller 110 (S93). Thereby, the controller 110 is capable of acquiring the battery residual amount in S75 of FIG. 15 and S82 of FIG. 16.

Incidentally, since the processing that the controllers 120 and 130 change the power to be supplied according to the notice from the controller 110 is similar to that in FIG. 13, the description thereof will be omitted.

(Modification 4)

In a modification 4, a controller 110 decides the priority of power supply according to data communication information indicative of whether each power receiving device performs a USB data communication. Specifically, the priority of the power receiving device which performs the USB data communication is made high, and the priority of the power receiving device which does not perform the USB data communication is made low. The USB data communication is a data communication corresponding to the USB standard. The data communication information is information indicative of whether the power receiving device supports the USB data communication.

Specifically, the controller 110 acquires data communication information of coupled power receiving devices 10, 20, and 30. For example, when the power receiving device 10 is coupled to its corresponding port 112, the controller 110 acquires the data communication information of the power receiving device 10 through the use of a USB PD communication.

For example, the port 112 is an Upstream Facing Port. When the power receiving device 10 being a host apparatus is coupled to the port 112, power is supplied from an electric power supplying circuit 111 to the power receiving device 10 through the use of the USB PD communication. Further, the controller 110 acquires and holds through the use of the USB PD communication, information that the coupled device is a USB host and also uses a USB data communication function.

Next, when the power receiving device 20 is coupled to it corresponding port 122, a controller 120 acquires USB data communication information of the power receiving device 20 through the use of the USB PD communication. Likewise, when the power receiving device 30 is coupled to its corresponding port 132, a controller 130 acquires data communication information of the power receiving device 30 through the use of the USB PD communication. Then, the controllers 120 and 130 transmit the data communication information of the power receiving devices 20 and 30 to the controller 110.

When the power receiving device 20 does not support the USB data communication, the controller 120 acquires this information as data communication information through the use of the USB PD communication. Then, the controller 120 transmits it to the controller 110 as data communication information. Further, when the power receiving device 30 supports the USB data communication, the controller 130 acquires this information as data communication information through the use of the USB PD communication. Then, the controller 130 transmits the data communication information to the controller 110. The controller 110 holds the data communication information of the power receiving devices 10, 20, and 30 in a memory or the like.

Figure 18:
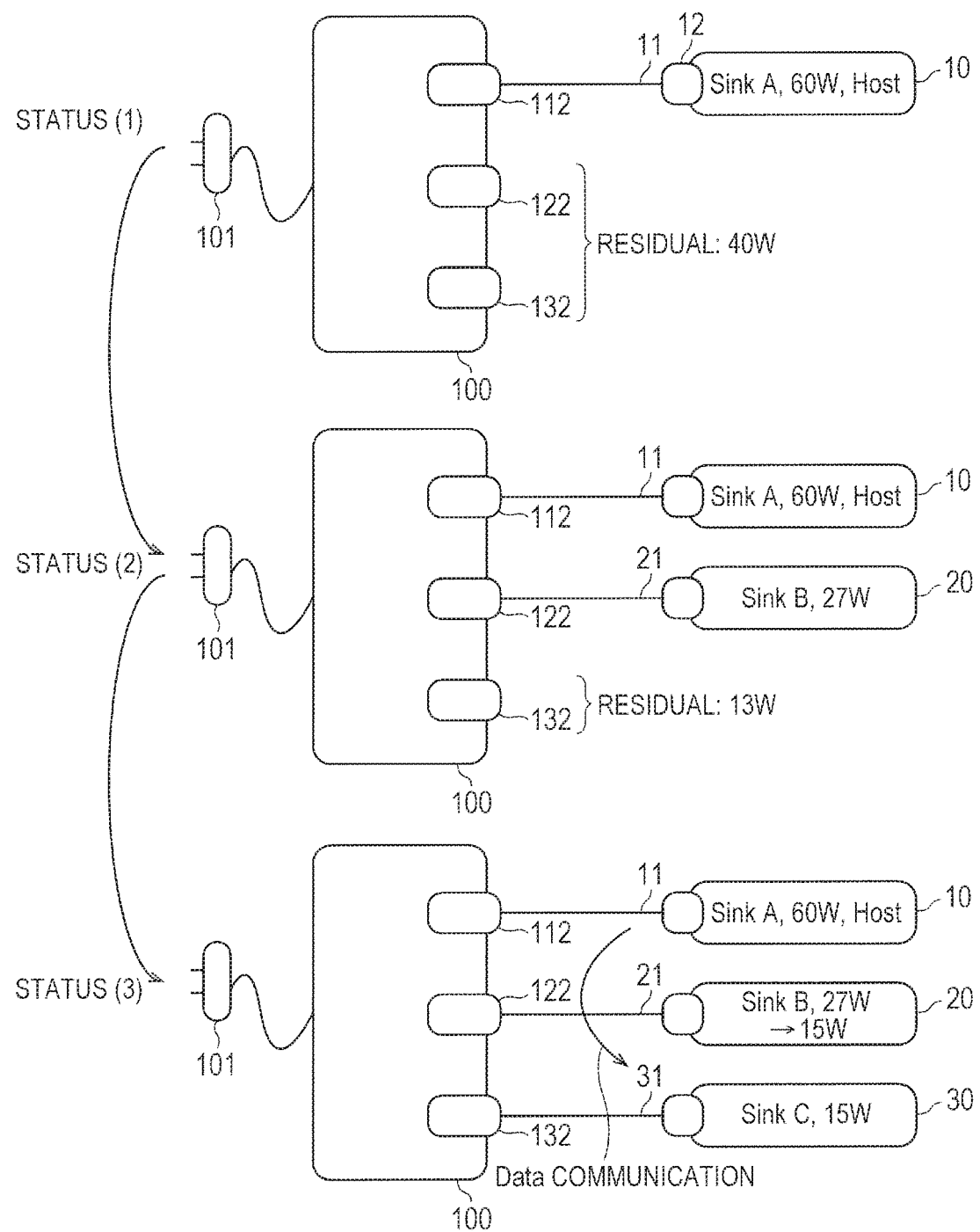
FIG. 18 is a diagram for describing a modification 4 which determines the priority of power supply according to the presence/absence of data communication.

The configuration of a power supplying apparatus 100 according to the present embodiment will be described using FIG. 18. FIG. 18 is a diagram for describing the operation of the power supplying apparatus 100. FIG. 18 shows the operation when the power receiving devices are coupled in the following order as with FIG. 2. Incidentally, since the basic configuration and operation of the power supplying apparatus 100 are similar to those of the above embodiment, the description thereof will be omitted.

(1) The power receiving device 10 having the data communication function is coupled to the port 112, (2) the power receiving device 20 having no data communication function is coupled to the port 122, and (3) the power receiving device 30 having the data communication function is coupled to the port 132.

The power receiving devices 10 and 30 are devices which perform the USB data communication. The power receiving device 20 is a device which does not perform the USB data communication. That is, the power receiving device 10 and the power receiving device 30 are devices which support the USB data communication, and the power receiving device 20 is a device which does not support the USB data communication.

Since the total supply power does not exceed a prescribed value in the statuses of (1) and (2), the controller 110 supplies powers of the maximum power receiving capabilities of power profile P1 and P2 to the power receiving devices 10 and 20 as with the embodiment 2. Further, the power receiving device 30 is coupled to the port 132, and a data communication is performed between the power receiving devices 10 and 30 which support the USB data communication.

In this case, in the status of (3), the controller 110 instructs the controller 120 to lower the priority of the supply of power to the power receiving device 20 which does not perform the USB data communication. That is, the controller 120 supplies power to the power receiving device 20 with a power receiving capability other than the maximum power receiving capability of the power profile P2 of the power receiving device 20. When it is determined that the total supply power exceeds the prescribed value, the controller 110 controls the power of the power receiving device 20 which does not perform the USB data communication, of the power receiving devices 10, 20, and 30, to be lowered. By doing like this, the total supply power of the power supplying apparatus 100 can be made so as not to exceed the prescribed value.

The controller 110 decides the priority of power supply, based on the data communication information of the coupled power receiving device. Thereby, high power can be supplied to the power receiving devices 10 and 30 being in data communication. Thus, it is possible to prevent a data communication speed from decreasing. Of course, the controller 110 may decide the priority with a combination of the data communication information, and the battery information or the coupling order.

Thus, since the priority of the power supply is decided based on various information, the controller 110 is capable of appropriately controlling the supply of power. Incidentally, although the above description has been made by taking the example in which the priority of the power supply is decided based on the user input, the coupling order, the battery information or the data communication information, the controller 110 is also capable of deciding the priority of the power feeding by using two or more of the user input, the coupling order, and the battery information. That is, the controller 110 may decide the priority with a combination of the two or more information. The priority may be set to respective parameters of the user input, coupling order, and battery information. Of course, the information for deciding the priority of the power supply is not limited to the above information.

(Master Controller)

Figure 19:
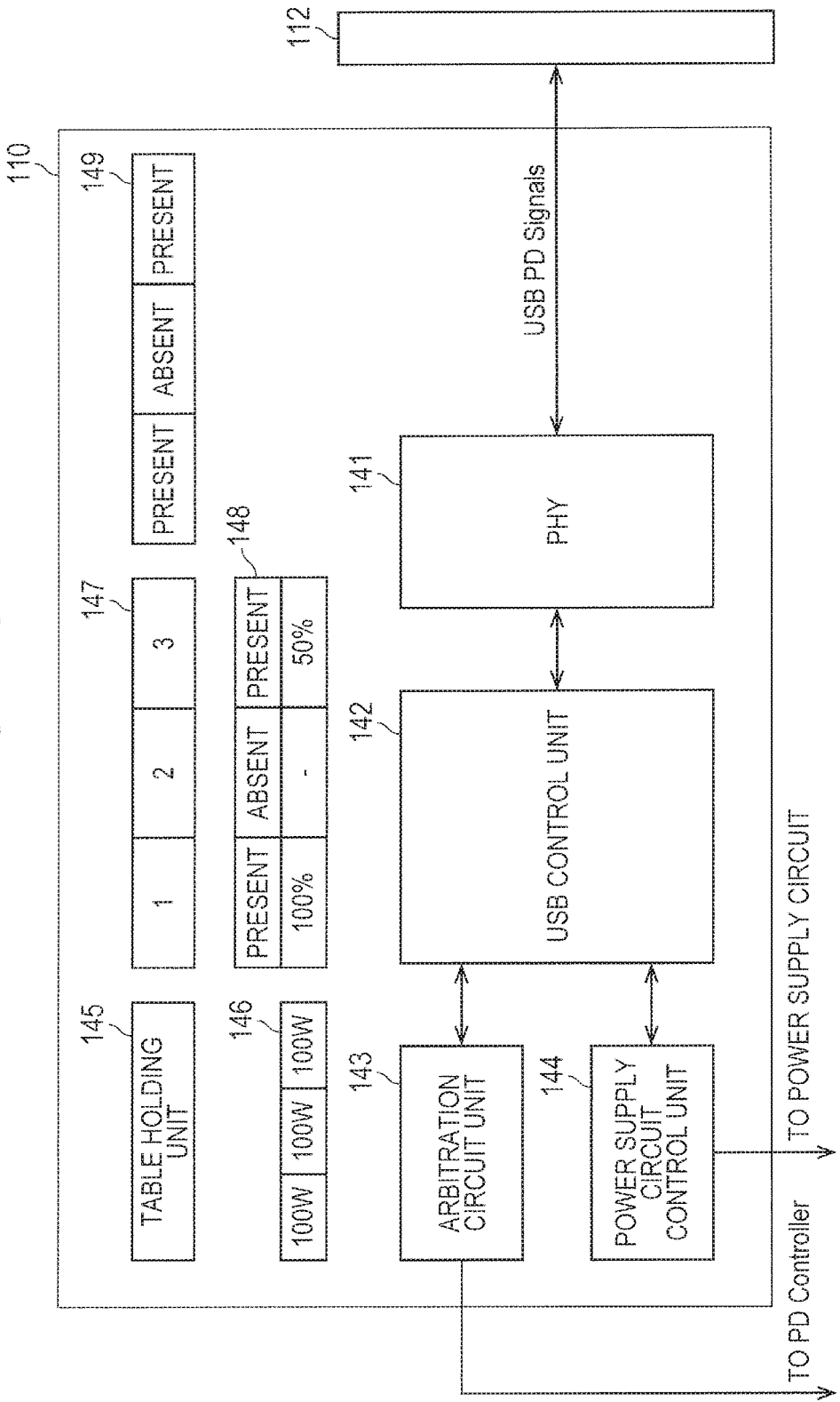
FIG. 19 is a block diagram showing the configuration of a controller.

The configuration of a controller 110 which can be used in a power supplying apparatus 100 will next be described using FIG. 19. FIG. 19 is a control block diagram of the controller 110 which serves as a power supplying control apparatus. The controller 110 is equipped with a physical layer 141, an arbitration circuit unit 143, a USB control unit 142, a power supply circuit control unit 144, a table holding unit 145, a port upper limit value holding unit 146, a coupling order holding unit 147, a battery information holding unit 148, and a data communication information holding unit 149.

The USB control unit 142 is a circuit which controls data communications corresponding to the USB PD standard and the USB Type-C standard. Further, the USB control unit 142 performs the transmission/reception of data and signals to and from the arbitration circuit unit 143, the physical layer 141, and the power supply circuit control unit 144. For example, the USB control unit 142 generates a transmission signal corresponding to a USB PD communication and transmits the same to the physical layer 141. Also, the USB control unit 142 controls the power supply circuit control unit 144 to output supply power selected by the arbitration circuit unit 143.

The physical layer 141 is a circuit which assumes a physical layer of a USB PD protocol and performs conversion of a signal level, etc. The physical layer 141 transmits and receives a USB PD signal to and from its corresponding port 112. Thus, a power receiving device 10 is capable of performing a USB PD communication. The power supply circuit control unit 144 controls a power supply circuit of an electric power supplying circuit 111. That is, the electric power supplying circuit 111 outputs power designated by the power supply circuit control unit 144 to the power receiving device 10 through the port 112.

The arbitration circuit unit 143 serves as an arbitration unit which decides a power distribution and notifies the same to other controllers. The arbitration circuit unit 143 performs the transmission/reception of an arbitration signal to and from other controllers 120 and 130 through a bus line 102. Then, the arbitration circuit unit 143 decides a power distribution with reference to a table of power profiles. Further, the arbitration circuit unit 143 selects a power receiving capability from within the power profiles P1 to P3 according to the power distribution. The arbitration circuit unit 143 outputs an arbitration signal corresponding to the selected power receiving capability to other controllers 120 and 130. Thus, the electric power supplying circuit 111 shown in FIG. 2 or the like supplies power corresponding to the power distribution to the power receiving device 10 through the port 112.

The table holding unit 145, the port upper limit value holding unit 146, the coupling order holding unit 147, the battery information holding unit 148, and the data communication information holding unit 149 are respectively of a storage unit having a register, a memory, etc. The USB control unit 142 writes various information into the table holding unit 145, the port upper limit value holding unit 146, the coupling order holding unit 147, the battery information holding unit 148, and the data communication information holding unit 149. Information of other controllers obtained through the bus line 102 is also written into the table holding unit 145, the port upper limit value holding unit 146, the coupling order holding unit 147, the battery information holding unit 148, and the data communication information holding unit 149. The arbitration circuit unit 143 decides a power distribution with reference to the various information written into the table holding unit 145, the port upper limit value holding unit 146, the coupling order holding unit 147, the battery information holding unit 148, and the data communication information holding unit 149.

The table holding unit 145 holds the table of the power profiles therein. For example, the table held in the table holding unit 145 is updated upon insertion/extraction of the power receiving device. As described above, the arbitration circuit unit 143 decides a power distribution with reference to the table held in the table holding unit 145.

The port upper limit value holding unit 146 holds the upper limit value of the power supplied to each port. Incidentally, since 100 W (20V, 5 A) can be supplied per port in the USB PD standard, the port upper limit value is normally taken to be 100 W. Incidentally, the port upper limit value may appropriately be changed according to the performance of the power supply circuits of the electric power supplying circuits 111, 121, and 131, etc. In this case, the port upper limit value per port may be set independently to the port upper limit value holding unit 146. The arbitration circuit unit 143 decides power to be supplied in such a manner that the power to be supplied to each port does not exceed the port upper limit value.

The coupling order holding unit 147 holds the order of coupling of each power receiving device therein. Specifically, the coupling order holding unit 147 stores port numbers in the coupled order. The coupling order holding unit 147 deletes the port number when the coupling of the power receiving device is decoupled, and moves up the port number. By doing like this, the coupling order holding unit 147 holds the coupling order therein.

Further, the battery information holding unit 148 holds the battery information therein as shown in the modification 3. The battery information includes battery presence/absence information and battery residual amount information. That is, in the power receiving device equipped with the battery, the residual amount of the battery is held as a battery residual amount. The battery information of the power receiving device 10 acquired through the port 112, and the battery information of the power receiving devices 20 and 30 acquired from the controllers 120 and 130 are written into the battery information holding unit 148. Incidentally, the battery information may be updated on a regular basis. Thus, it is possible to perform power supply control more appropriately.

Incidentally, the battery presence/absence information may be acquired when coupling the power receiving device. Further, the battery residual amount information may also be acquired only when coupling the power receiving device. Alternatively, the battery residual amount information may be acquired at a timing at which the selection button 201 is depressed. Of course, the timing provided to acquire and update the battery information is not limited in particular. The battery residual amount information may be updated on a regular basis. The battery residual amount information may be updated at a timing at which the charging is completed.

The data communication information holding unit 149 holds the data communication information of the power receiving devices therein as shown in the modification 4. That is, the information indicative of whether the power receiving device being in coupling corresponds to the USB data communication is stored in the data communication information holding unit 149. Here, information about the presence/absence of the data communication function is stored for each of the power receiving devices 10, 20, and 30.

Another Embodiment

Figure 20:
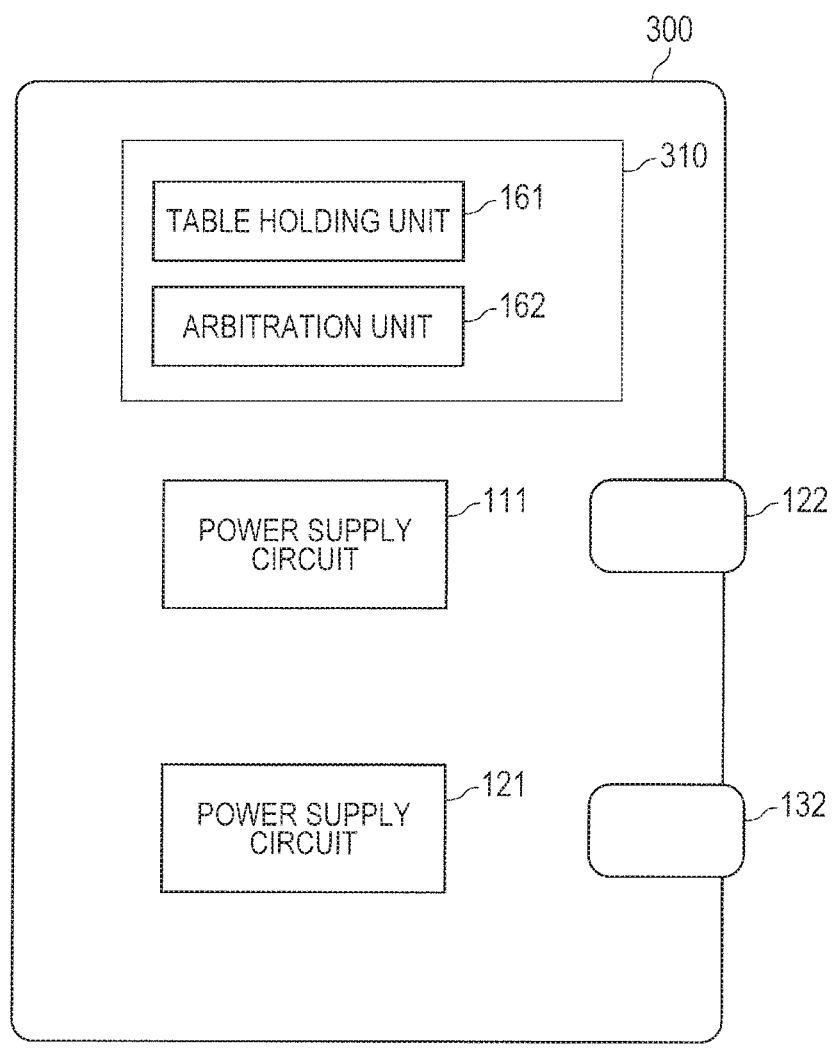
FIG. 20 is a block diagram showing the configuration of a controller and a power supplying apparatus according to another embodiment.

The configuration of a power supplying apparatus 300 and a controller 310 according to the present embodiment will be described using FIG. 20.

The power supplying apparatus 300 is equipped with ports 112 and 122, a plurality of electric power supplying circuits 111 and 121, and a controller 310. The ports 112 and 122 are USB ports corresponding to a USB (Universal Serial Bus) PD (Power Delivery) standard. The electric power supplying circuits 111 and 121 are provided corresponding to the ports 112 and 122 and supply power to power receiving devices 10 and 20 coupled to the ports 112 and 122 respectively. The controller 310 holds a table of power profiles to which power receiving capabilities assigned for each of the power receiving devices 10 and 20 are set. The controller 310 controls the electric power supplying circuits 111 and 121, based on the table, in such a manner that the total supply power supplied from the electric power supplying circuits 111 and 121 does not exceed a prescribed value.

Further, the controller 310 has a table holding unit 161 and an arbitration unit 162. The table holding unit 161 acquires power profiles of power receiving devices coupled to a plurality of USB ports corresponding to the USB (Universal Serial Bus) PD (Power Delivery) standard and holds them as a table of the power profiles. The arbitration unit 162 controls power supplied to the ports 112 and 122, respectively, based on the table in such a manner that the total supply power supplied to the power receiving devices 10 and 20 through the USB ports 112 and 122 does not exceed the prescribed value.

According to this configuration, there can be obtained an effect similar to the above. Incidentally, the above embodiments and their modifications can appropriately be combined. For example, the controllers 110 and 310 are capable of determining the priority of power supply on the basis of information in which any one of the coupling order, battery information, user input, and data communication information, or two or more thereof are combined. Incidentally, the various control of the controllers 110 and 310, etc. can be executed by a computer program.

Some or all of the above embodiments can be also described as in the following appendices, but are not limited to the following.

(Appendix 1)

A power supplying apparatus including:

a plurality of USB ports corresponding to a USB (Universal Serial Bus) PD (Power Delivery) standard;

a plurality of electric power supplying circuits provided corresponding to the USB ports, which supply power to power receiving devices coupled to the USB ports; and a controller which holds a table of power profiles to which power receiving capabilities for each power receiving device are set, and controls the electric power supplying circuits, based on the table in such a manner that total supply power supplied from the electric power supplying circuits does not exceed a prescribed value.

(Appendix 2)

The power supplying apparatus described in the appendix 1, in which the controller updates the table of the power profiles upon insertion/extraction of the power receiving devices into and from the USB ports.

(Appendix 3)

The power supplying apparatus described in the appendix 1, in which the controller acquires a coupling order in which the power receiving devices are coupled to the USB ports, and controls power supplied to the USB ports according to the coupling order (Appendix 4)

The power supplying apparatus described in the appendix 1, in which the controller acquires battery presence/absence information indicative of whether the power receiving devices respectively have a battery, and controls power supplied to the USB ports, based on the battery presence/absence information.

(Appendix 5)

The power supplying apparatus described in the appendix 4, in which the controller acquires battery residual amount information corresponding to a battery residual amount in each power receiving device having the battery, and controls power supplied to the USB ports according to the battery residual amount information and the battery presence/absence information.

(Appendix 6)

The power supplying apparatus described in the appendix 1, further including a user interface which notifies power receiving statuses for each of the power receiving devices to a user and accepts a change of priority of power supply to the power receiving devices from the user, in which the controller controls the electric power supplying circuits, based on the priority.

(Appendix 7)

The power supplying apparatus described in the appendix 1, in which the controller determines whether the total supply power when power supplied to the power receiving devices is taken as a maximum value set to the power profiles exceeds the prescribed value, and in which when the total supply power is determined to exceed the prescribed value, the controller controls the power of the power receiving device free from a USB data communication, of the power receiving devices to be lowered.

(Appendix 8)

The power supplying apparatus described in the appendix 1, which determines whether the total supply power when the power supplied to the power receiving devices is taken as a maximum value set to the power profiles exceeds the prescribed value, and when the total supply power is determined to exceed the prescribed value, controls the electric power supplying circuits in such a manner that power supplied to the power receiving devices greater than or equal to one is supplied with a set value lower than the maximum value set to the power profiles.

(Appendix 9)

The power supplying apparatus described in the appendix 8, which when the power receiving device is newly coupled to the USB port, determines whether the total supply power when the power supplied to the power receiving devices is taken as a maximum value set to the power profiles exceeds the prescribed value, and when the total supply power is determined to exceed the prescribed value, controls the electric power supplying circuits in such a manner that power supplied to the newly coupled power receiving device is supplied with a set value lower than the maximum value set to the power profiles.

(Appendix 10)

The power supplying apparatus described in the appendix 8, which when the power receiving device is newly coupled to the USB port, determines whether total supply power when a power receiving capability of the newly coupled power receiving device is taken as a maximum value set to the power profiles exceeds the prescribed value, and when the total supply power is determined to exceed the prescribed value, controls the electric power supplying circuits in such a manner that power supplied to the power receiving device other than the newly coupled power receiving device is supplied with a set value lower than the maximum value set to the power profiles.

(Appendix 11)

The power supplying apparatus described in the appendix 1, which determines whether the total supply power when the power supplied to the power receiving devices is taken as a minimum value set to the power profiles exceeds the prescribed value, and when the total supply power is determined to exceed the prescribed value, controls the electric power supplying circuits in such a manner that the supply of power to the power receiving devices greater than or equal to one is stopped.

(Appendix 12)

A power supplying control apparatus including:

a table holding unit which acquires power profiles of power receiving devices coupled to a plurality of USB ports corresponding to a USB (Universal Serial Bus) PD (Power Delivery) standard and holds the power profiles as a table thereof; and an arbitration unit which controls power supplied to the USB ports respectively, based on the table in such a manner that total supply power supplied to the power receiving devices through the USB ports does not exceed a prescribed value.

(Appendix 13)

The power supplying control apparatus described in the appendix 12, in which the table of the power profiles is updated upon insertion/extraction of the power receiving devices into and from the USB ports.

(Appendix 14)

The power supplying control apparatus described in the appendix 12, which acquires a coupling order in which the power receiving devices are coupled to the USB ports, and
controls power supplied to the USB ports according to the coupling order.

(Appendix 15)

The power supplying control apparatus described in the appendix 12, which acquires battery presence/absence information indicative of whether the power receiving devices respectively have a battery, and
controls power supplied to the USB ports, based on the battery presence/absence information.

(Appendix 16)

The power supplying control apparatus described in the appendix 15, which acquires battery residual amount information corresponding to a battery residual amount in each power receiving device having the battery, and
controls power supplied to the USB ports according to the battery residual amount information and the battery presence/absence information.

(Appendix 17)

The power supplying control apparatus described in the appendix 12, which changes power supplied to the USB ports according to a user input from a user for changing priority of power supply to the power receiving devices.

(Appendix 18)

The power supplying control apparatus described in the appendix 12, which determines whether the total supply power when the power supplied to the power receiving devices is taken as a maximum value set to the power profiles exceeds the prescribed value, and
controls the power of the power receiving device free from a USB data communication, of the power receiving devices to be lowered when the total supply power is determined to exceed the prescribed value.

(Appendix 19)

The power supplying control apparatus described in the appendix 12, which determines whether the total supply power when the power supplied to the power receiving devices is taken as a maximum value set to the power profiles exceeds the prescribed value, and
when the total supply power is determined to exceed the prescribed value, supplies power supplied to the power receiving devices greater than or equal to one with a set value lower than the maximum value set to the power profiles.

(Appendix 20)

The power supplying control apparatus described in the appendix 19, which when the power receiving device is newly coupled to the USB port, determines whether the total supply power when the power supplied to the power receiving devices is taken as a maximum value set to the power profiles exceeds the prescribed value, and
when the total supply power is determined to exceed the prescribed value, supplies power supplied to the newly coupled power receiving device with a set value lower than the maximum value set to the power profiles.

(Appendix 21)

The power supplying control apparatus described in the appendix 19, which when the power receiving device is newly coupled to the USB port, determines whether total supply power when a power receiving capability of the newly coupled power receiving device is taken as a maximum value set to the power profiles exceeds the prescribed value, and
when the total supply power is determined to exceed the prescribed value, supplies power supplied to the power receiving device other than the newly coupled power receiving device with a set value lower than the maximum value set to the power profiles.

(Appendix 22)

The power supplying control apparatus described in the appendix 12, which determines whether the total supply power when the power supplied to the power receiving devices is taken as a minimum value set to the power profiles exceeds the prescribed value, and
when the total supply power is determined to exceed the prescribed value, stops the supply of power to the power receiving devices greater than or equal to one.

(Appendix 23)

A power supplying control method including the steps of:

acquiring power profiles of power receiving devices coupled to a plurality of USB ports corresponding to a USB (Universal Serial Bus) PD (Power Delivery) standard; and determining a power distribution to the USB ports, based on a table of the power profiles of the power receiving devices in such a manner that total supply power supplied from the electric power supplying circuits does not exceed a prescribed value.

(Appendix 24)

The power supplying control method described in the appendix 23, including the step of updating the table of the power profiles upon insertion/extraction of the power receiving devices into and from the USB ports.

(Appendix 25)

The power supplying control method described in the appendix 23, including the steps of:

acquiring a coupling order in which the power receiving devices are coupled to the USB ports, and
controlling power supplied to the USB ports according to the coupling order.

(Appendix 26)

The power supplying control method described in the appendix 23, including the steps of:

acquiring battery presence/absence information indicative of whether the power receiving devices respectively have a battery, and
controlling power supplied to the USB ports, based on the battery presence/absence information.

(Appendix 27)

The power supplying control method described in the appendix 26, including the steps of:

acquiring battery residual amount information corresponding to a battery residual amount in each power receiving device having the battery, and controlling power supplied to the USB ports according to the battery residual amount information and the battery presence/absence information.

(Appendix 28)

The power supplying control method described in the appendix 23, including the step of changing power supplied to the USB ports according to a user input from the user for changing priority of power supply to the power receiving devices.

(Appendix 29)

The power supplying control method described in the appendix 23, including the steps of:

determining whether the total supply power when power supplied to the power receiving devices is taken as a maximum value set to the power profiles exceeds the prescribed value, and controlling the power of the power receiving device free from a USB data communication, of the power receiving devices to be lowered when the total supply power is determined to exceed the prescribed value.

(Appendix 30)

The power supplying control method described in the appendix 23, including the steps of:

determining whether the total supply power when the power supplied to the power receiving devices is taken as a maximum value set to the power profiles exceeds the prescribed value, and when the total supply power is determined to exceed the prescribed value, controlling the electric power supplying circuits in such a manner that power supplied to the power receiving devices greater than or equal to one is supplied with a set value lower than the maximum value set to the power profiles.

(Appendix 31)

The power supplying control method described in the appendix 30, including the steps of:

when the power receiving device is newly coupled to the USB port, determining whether the total supply power when the power supplied to the power receiving devices is taken as a maximum value set to the power profiles exceeds the prescribed value, and when the total supply power is determined to exceed the prescribed value, controlling the electric power supplying circuits in such a manner that power supplied to the newly coupled power receiving device is supplied with a set value lower than the maximum value set to the power profiles.

(Appendix 32)

The power supplying control method described in the appendix 30, including the steps of:

when the power receiving device is newly coupled to the USB port, determining whether total supply power when a power receiving capability of the newly coupled power receiving device is taken as a maximum value set to the power profiles exceeds the prescribed value, and when the total supply power is determined to exceed the prescribed value, controlling the electric power supplying circuits in such a manner that power supplied to the power receiving device other than the newly coupled power receiving device is supplied with a set value lower than the maximum value set to the power profiles.

(Appendix 33)

The power supplying control method described in the appendix 23, including the steps of:

determining whether the total supply power when the power supplied to the power receiving devices is taken as a minimum value set to the power profiles exceeds the prescribed value, and when the total supply power is determined to exceed the prescribed value, controlling the electric power supplying circuits in such a manner that the supply of power to the power receiving devices greater than or equal to one is stopped.

Although the invention made above by the present inventors has been described specifically on the basis of the preferred embodiments, the present invention is not limited to the embodiments already described. It is needless to say that various changes can be made thereto within the scope not departing from the gist thereof.

What is claimed is:

1. A power supplying apparatus comprising:
   a plurality of USB ports corresponding to a USB (Universal Serial Bus) PD (Power Delivery) standard;
   a plurality of electric power supplying circuits provided corresponding to the USB ports, which supply power to power receiving devices coupled to the USB ports; and
   a controller which holds a table of power profiles to which power receiving capabilities for each power receiving device are set, and controls the electric power supplying circuits, based on the table in such a manner that total supply power supplied from the electric power supplying circuits does not exceed a prescribed value,
   wherein the controller updates the table of the power profiles upon insertion/extraction of the power receiving devices into and from the USB ports.

2. The power supplying apparatus according to claim 1, wherein the controller acquires a coupling order in which the power receiving devices are coupled to the USB ports, and
   wherein the controller controls power supplied to the USB ports according to the coupling order.

3. The power supplying apparatus according to claim 1, wherein the controller acquires battery presence/absence information indicative of whether the power receiving devices respectively have a battery, and
   wherein the controller controls power supplied to the USB ports, based on the battery presence/absence information.

4. The power supplying apparatus according to claim 3, wherein the controller acquires battery residual amount information corresponding to a battery residual amount in each power receiving device having the battery, and
   wherein the controller controls power supplied to the USB ports according to the battery residual amount information and the battery presence/absence information.

5. The power supplying apparatus according to claim 1, further comprising a user interface which notifies power receiving statuses every the power receiving devices to a user and accepts a change of priority of power supply to the power receiving devices from the user,
   wherein the controller controls the electric power supplying circuits, based on the priority.

6. The power supplying apparatus according to claim 1, wherein the controller determines whether the total supply power when power supplied to the power receiving devices is taken as a maximum value set to the power profiles exceeds the prescribed value, and wherein when the total supply power is determined to exceed the prescribed value, the controller controls the power of the power receiving device free from a USB data communication to be lowered.

7. The power supplying apparatus according to claim 1, wherein the power supplying apparatus determines whether the total supply power when the power supplied to the power receiving devices is taken as a maximum value set to the power profiles exceeds the prescribed value, and wherein when the total supply power is determined to exceed the prescribed value, the power supplying apparatus controls the electric power supplying circuits in such a manner that power supplied to one or more of the power receiving devices is supplied with a set value lower than the maximum value set to the power profiles.

8. The power supplying apparatus according to claim 7, wherein when the power receiving device is newly coupled to the USB port, the power supplying apparatus determines whether the total supply power when the power supplied to the power receiving devices is taken as a maximum value set to the power profiles exceeds the prescribed value, and wherein when the total supply power is determined to exceed the prescribed value, the power supplying apparatus controls the electric power supplying circuits in such a manner that power supplied to the newly coupled power receiving device is supplied with a set value lower than the maximum value set to the power profiles.

9. The power supplying apparatus according to claim 7, wherein when the power receiving device is newly coupled to the USB port, the power supplying apparatus determines whether total supply power when a power receiving capability of the newly coupled power receiving device is taken as a maximum value set to the power profiles exceeds the prescribed value, and wherein when the total supply power is determined to exceed the prescribed value, the power supplying apparatus controls the electric power supplying circuits in such a manner that power supplied to the power receiving device other than the newly coupled power receiving device is supplied with a set value lower than the maximum value set to the power profiles.

10. The power supplying apparatus according to claim 1, wherein the power supplying apparatus determines whether the total supply power when the power supplied to the power receiving devices is taken as a minimum value set to the power profiles exceeds the prescribed value, and wherein when the total supply power is determined to exceed the prescribed value, the power supplying apparatus controls the electric power supplying circuits in such a manner that the supply of power to one or more of the power receiving devices is stopped.

11. A power supplying control apparatus comprising:
a table holding unit which acquires power profiles of power receiving devices coupled to a plurality of USB ports corresponding to a USB (Universal Serial Bus) PD (Power Delivery) standard and holds the power profiles as a table thereof; and
an arbitration unit which controls power supplied to the USB ports respectively, based on the table in such a manner that total supply power supplied to the power receiving devices through the USB ports does not exceed a prescribed value, wherein the controller updates the table of the power profiles upon insertion/extraction of the power receiving devices into and from the USB ports.

12. The power supplying control apparatus according to claim 11,
wherein the power supplying control apparatus acquires a coupling order in which the power receiving devices are coupled to the USB ports, and
wherein the power supplying control apparatus controls power supplied to the USB ports according to the coupling order.

13. The power supplying control apparatus according to claim 11,
wherein the power supplying control apparatus acquires battery presence/absence information indicative of whether the power receiving devices respectively have a battery, and
wherein the power supplying control apparatus controls power supplied to the USB ports, based on the battery presence/absence information.

14. The power supplying control apparatus according to claim 13,
wherein the power supplying control apparatus acquires battery residual amount information corresponding to a battery residual amount in each power receiving device having the battery, and
wherein the power supplying control apparatus controls power supplied to the USB ports according to the battery residual amount information and the battery presence/absence information.

15. The power supplying control apparatus according to claim 11,
wherein the power supplying control apparatus changes power supplied to the USB ports according to a user input from a user for changing priority of power supply to the power receiving devices.

16. The power supplying control apparatus according to claim 11,
wherein the power supplying control apparatus determines whether the total supply power when power supplied to the power receiving devices is taken as a maximum value set to the power profiles exceeds the prescribed value, and
wherein the power supplying control apparatus controls the power of the power receiving device free from a USB data communication, of the power receiving devices to be lowered when the total supply power is determined to exceed the prescribed value.

17. A power supplying apparatus comprising:
a plurality of USB (Universal Serial Bus) ports corresponding to a USB PD (Power Delivery) standard;
a plurality of electric power supplying circuits provided corresponding to the USB ports, which supply power to power receiving devices coupled to the USB ports; and
a plurality of controllers configured to hold a power profile configured with a power receiving capability for each power receiving device,
wherein one of the plurality of controllers serves as a master controller and the other of the plurality of controllers serve as slave controllers,
wherein the master controller generates a table of the power profiles, based on the power profile of the master controller and the power profiles transmitted by the slave controllers, and wherein the master controller determines a power distribution, based on the table of the power profiles, so that a total supply power supplied from the plurality of the electric power supplying circuits does not exceed a prescribed value.

18. The power supplying apparatus according to claim 17, wherein the master controller acquires a coupling order in which the power receiving devices are coupled to the USB ports, and controls power supplied to the USB ports according to the coupling order.

19. The power supplying apparatus according to claim 17, wherein the master controller acquires battery presence/absence information indicative of whether the power receiving devices respectively have a battery, and controls power supplied to the USB ports, based on the battery presence/absence information.

* * * * *